(12) United States Patent
Lee et al.

(10) Patent No.: US 10,497,336 B2
(45) Date of Patent: Dec. 3, 2019

(54) MOBILE TERMINAL AND METHOD OF PROVIDING A PAGE AND/OR OBJECT LAYOUT

(71) Applicant: Samsung Electronics Co., Ltd., Gyeonggi-do (KR)

(72) Inventors: Ho-Young Lee, Seoul (KR); Jee-Yeun Wang, Seoul (KR); Jee-Won Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 529 days.

(21) Appl. No.: 15/110,059

(22) PCT Filed: Nov. 19, 2014

(86) PCT No.: PCT/KR2014/011128
§ 371 (c)(1),
(2) Date: Jul. 6, 2016

(87) PCT Pub. No.: WO2015/102227
PCT Pub. Date: Jul. 9, 2015

(65) Prior Publication Data
US 2016/0335980 A1    Nov. 17, 2016

(30) Foreign Application Priority Data

Jan. 6, 2014    (KR) .................. 10-2014-0001365

(51) Int. Cl.
*G09G 5/00*    (2006.01)
*G06F 1/16*    (2006.01)
(Continued)

(52) U.S. Cl.
CPC .......... *G09G 5/003* (2013.01); *G06F 1/1626* (2013.01); *G06F 1/1677* (2013.01);
(Continued)

(58) Field of Classification Search
None
See application file for complete search history.

(56) References Cited

U.S. PATENT DOCUMENTS

D692,878 S    11/2013    Akana et al.
8,928,437 B2 *  1/2015    Lauder ............. G06F 1/1626
                                                    206/320

(Continued)

FOREIGN PATENT DOCUMENTS

| KR | 20020062453 | 7/2002 |
|----|-------------|--------|
| KR | 1020050029141 | 3/2005 |
| KR | 1020080047938 | 5/2008 |
| KR | 1020100025890 | 3/2010 |
| KR | 1020130018393 | 2/2013 |

OTHER PUBLICATIONS

PCT/ISA/210 Search Report issued on PCT/KR2014/011128 (pp. 3).

*Primary Examiner* — David D Davis
(74) *Attorney, Agent, or Firm* — The Farrell Law Firm, P.C.

(57) ABSTRACT

A mobile terminal and method are provided. The mobile terminal includes a touch screen and a controller which determines an opening angle of a front cover unit of the mobile terminal. The opening angle is an angle between the mobile terminal and a front cover unit included in a cover connected to the mobile terminal. The controller displays one or more pages on the touch screen, where each page is displayed at a proportion determined based on the opening angle.

22 Claims, 32 Drawing Sheets

(51) Int. Cl.
*H04M 1/725* (2006.01)
*H04M 1/02* (2006.01)
*G06F 3/0346* (2013.01)
*G06F 3/041* (2006.01)
*G06F 3/0485* (2013.01)
*G06F 3/0488* (2013.01)
*G09G 5/377* (2006.01)
*G09G 5/38* (2006.01)

(52) U.S. Cl.
CPC ............ *G06F 3/0346* (2013.01); *G06F 3/041* (2013.01); *G06F 3/0485* (2013.01); *G06F 3/0488* (2013.01); *G09G 5/377* (2013.01); *G09G 5/38* (2013.01); *H04M 1/0243* (2013.01); *H04M 1/72522* (2013.01); *G06F 2200/1634* (2013.01); *G06F 2203/04803* (2013.01); *H04M 2250/22* (2013.01)

(56) References Cited

U.S. PATENT DOCUMENTS

| | | | | |
|---|---|---|---|---|
| 9,326,404 | B1* | 4/2016 | Wood | G09G 5/003 |
| 9,335,793 | B2* | 5/2016 | Rothkopf | A45C 13/002 |
| 2010/0085384 | A1* | 4/2010 | Kim | G06F 3/0488 |
| | | | | 345/660 |
| 2010/0100842 | A1* | 4/2010 | Kim | G06F 1/1626 |
| | | | | 715/808 |
| 2011/0065474 | A1* | 3/2011 | Won | H02J 7/355 |
| | | | | 455/556.1 |
| 2012/0060089 | A1* | 3/2012 | Heo | G06F 1/1647 |
| | | | | 715/702 |
| 2013/0298068 | A1* | 11/2013 | Lee | G06F 3/0483 |
| | | | | 715/776 |
| 2013/0321264 | A1* | 12/2013 | Park | G06F 3/01 |
| | | | | 345/156 |
| 2014/0159839 | A1 | 6/2014 | Kim | |

* cited by examiner

[Fig. 1]
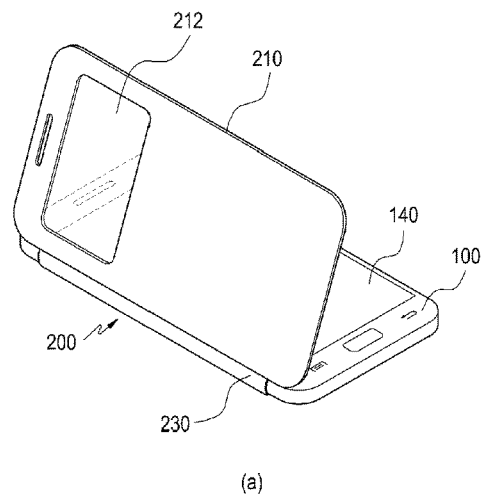
(a)
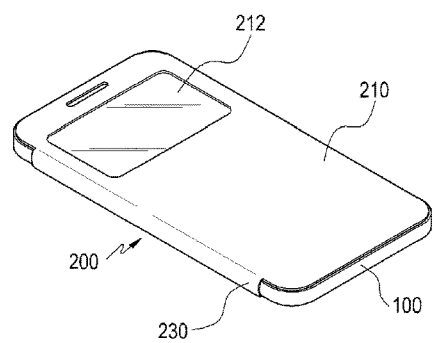
(b)
[Fig. 2]
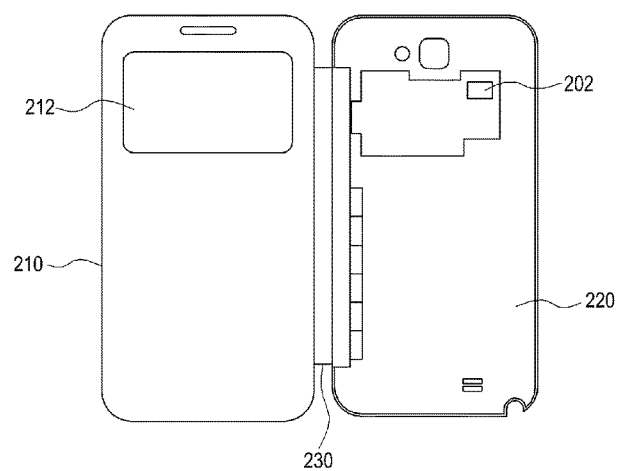

[Fig. 3]
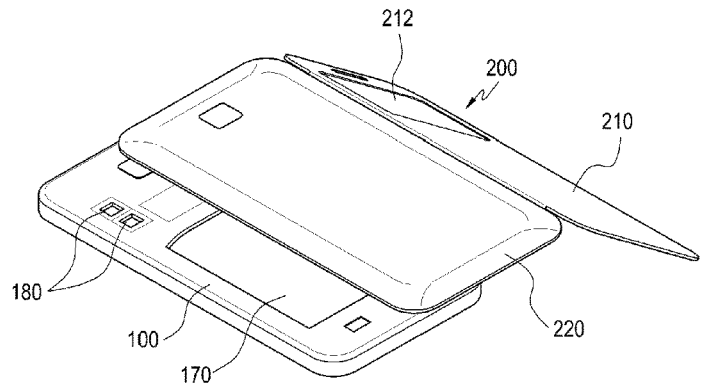
[Fig. 4]
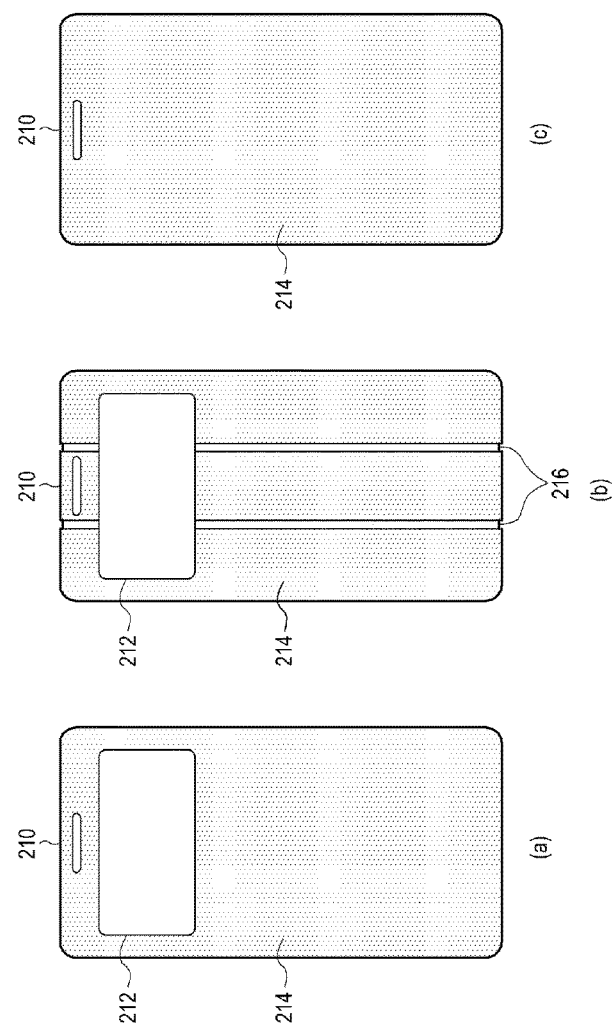

[Fig. 5]
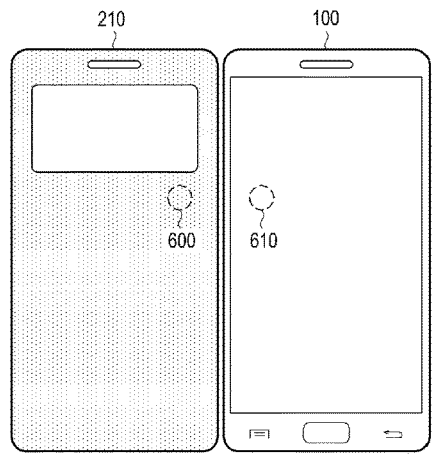
[Fig. 6]
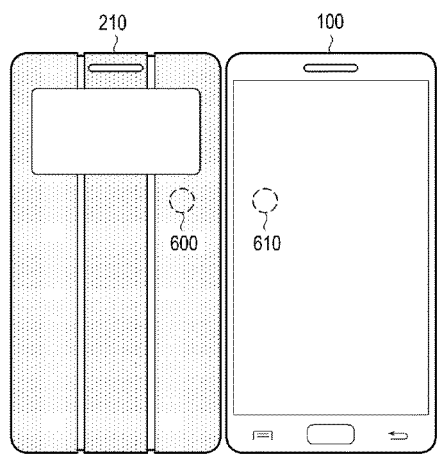
[Fig. 7]
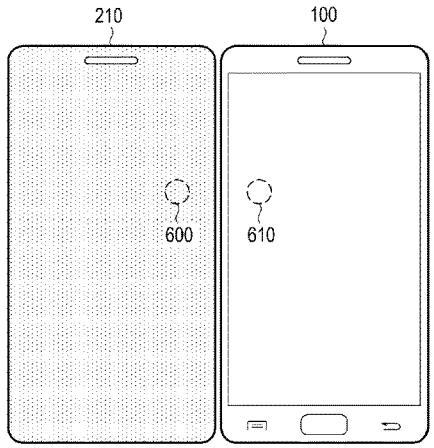

[Fig. 8]
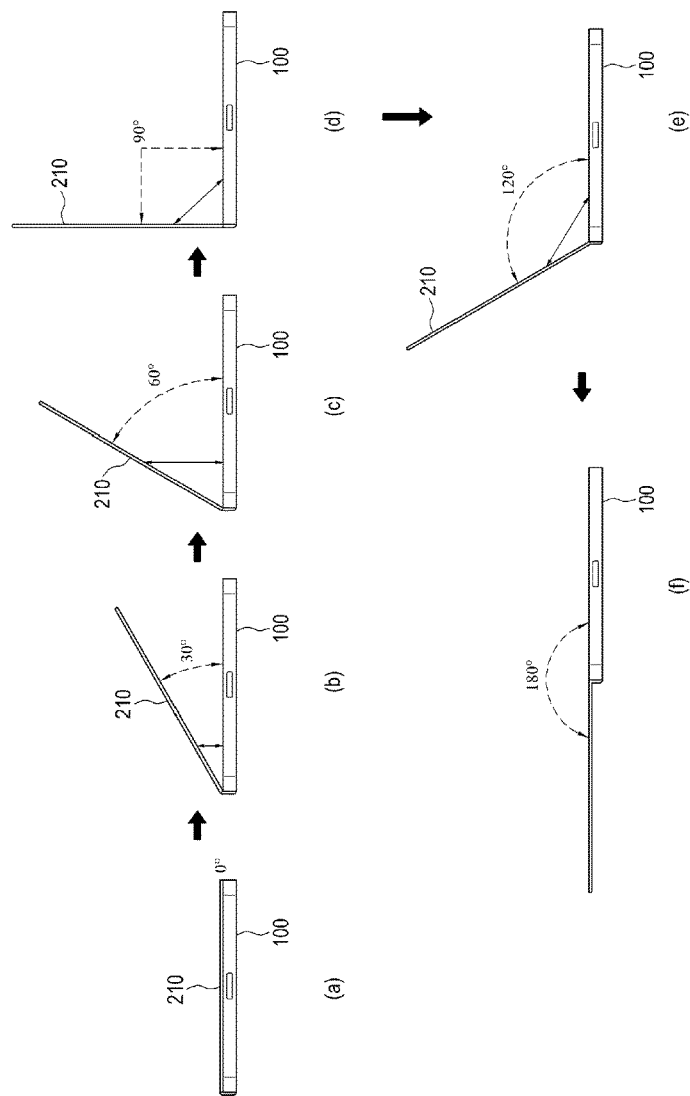
[Fig. 9]
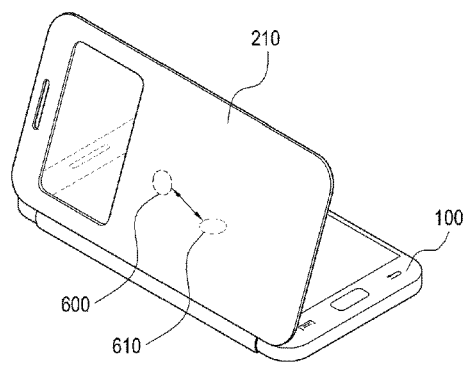

[Fig. 10]
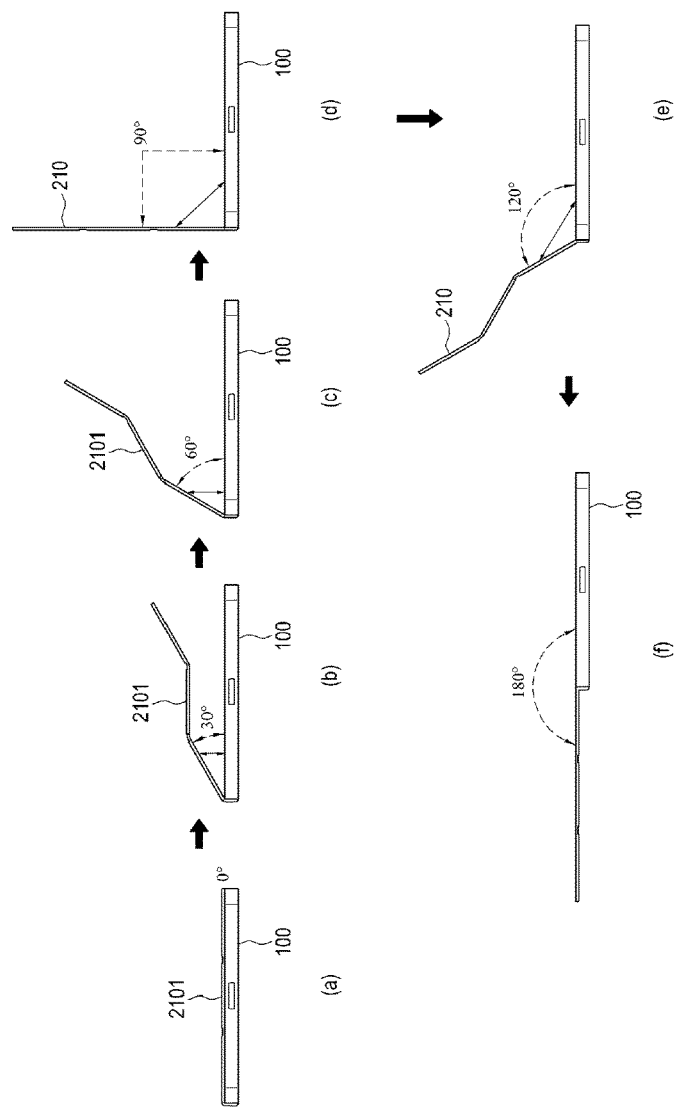
[Fig. 11]
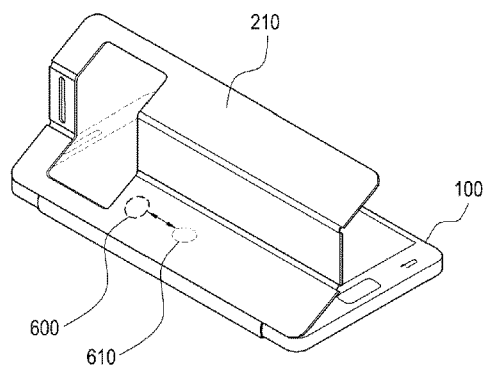

[Fig. 12]
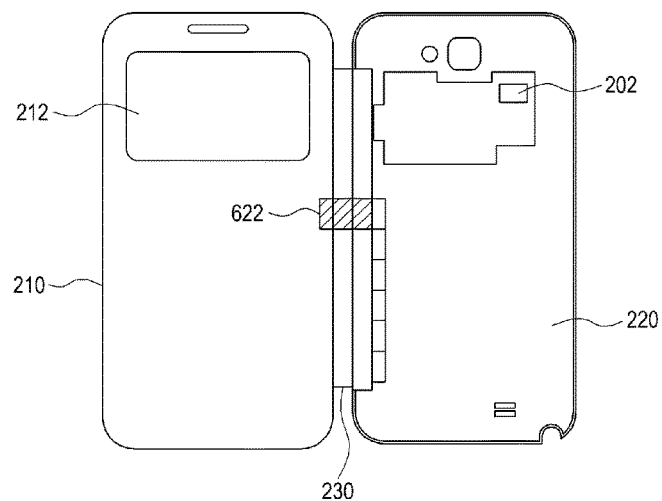
[Fig. 13]
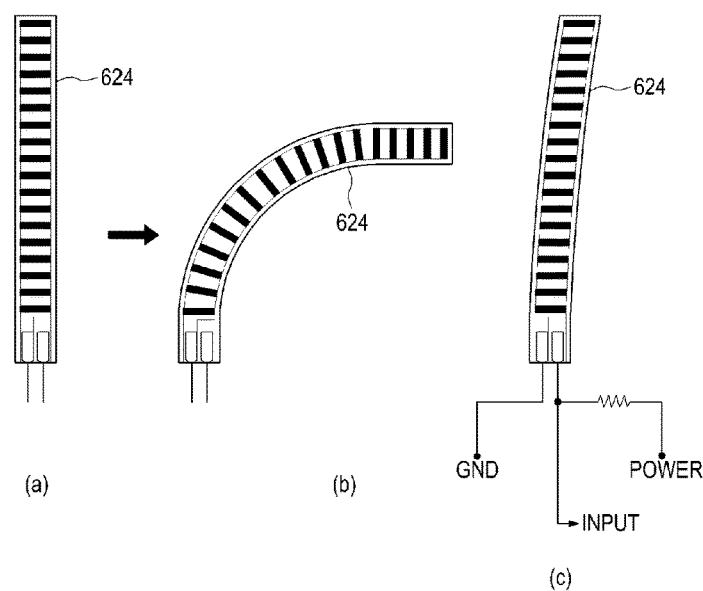
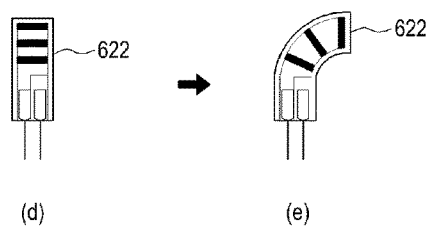

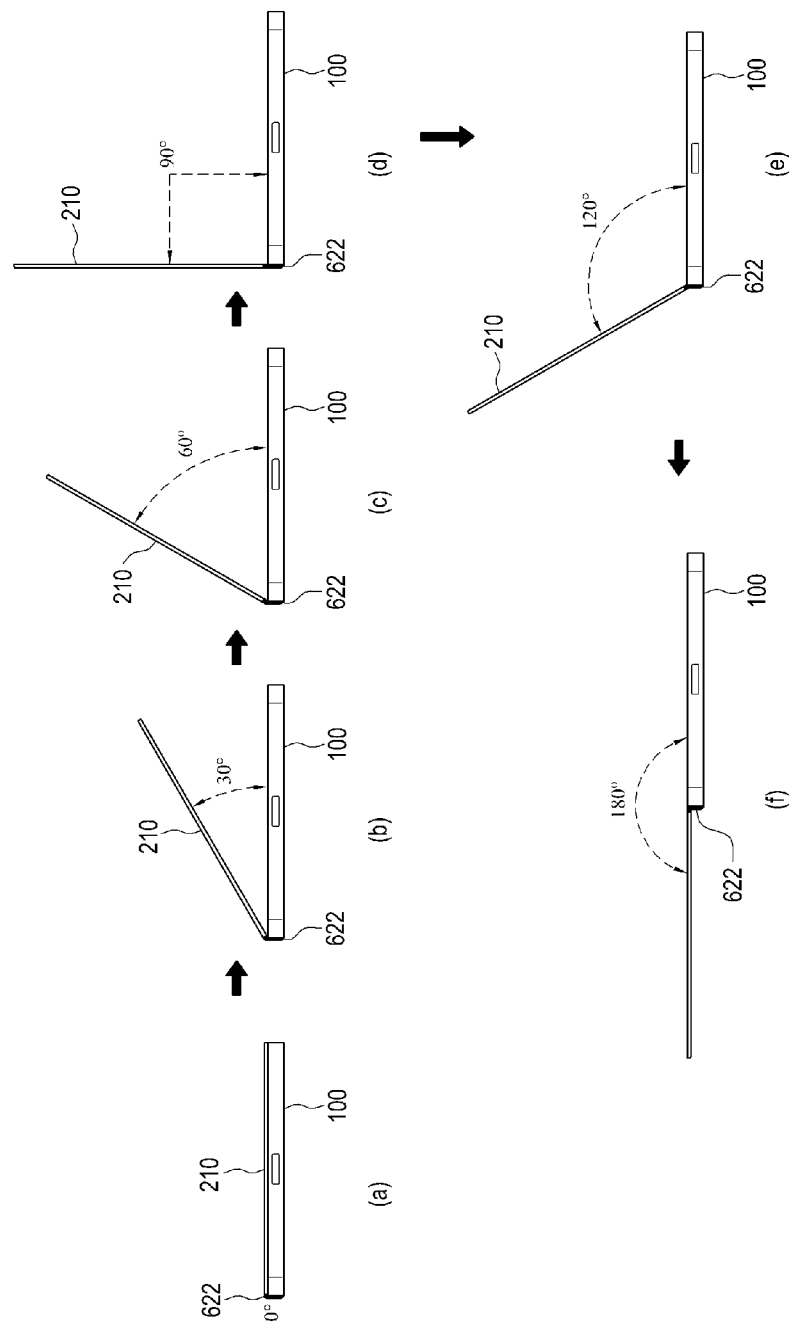
[Fig. 14]

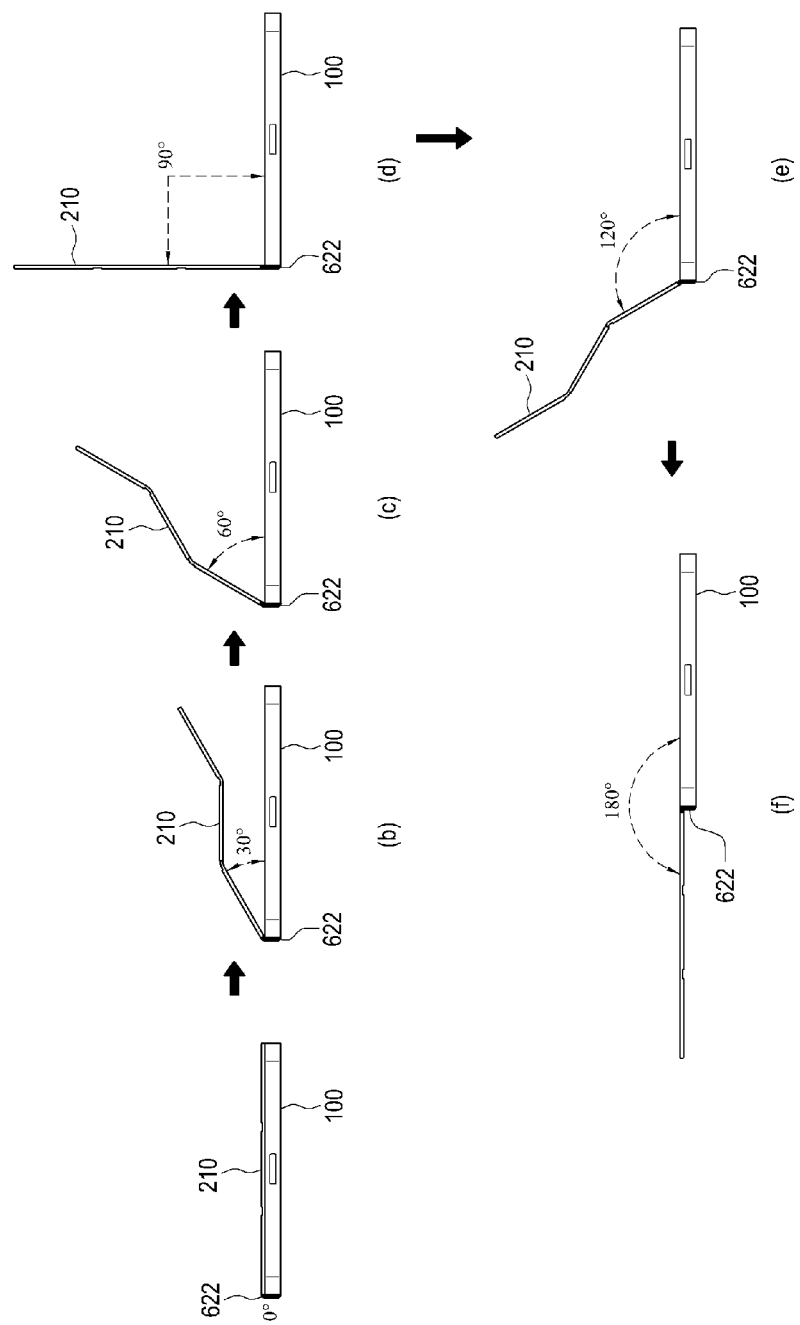
[Fig. 15]

[Fig. 16a]
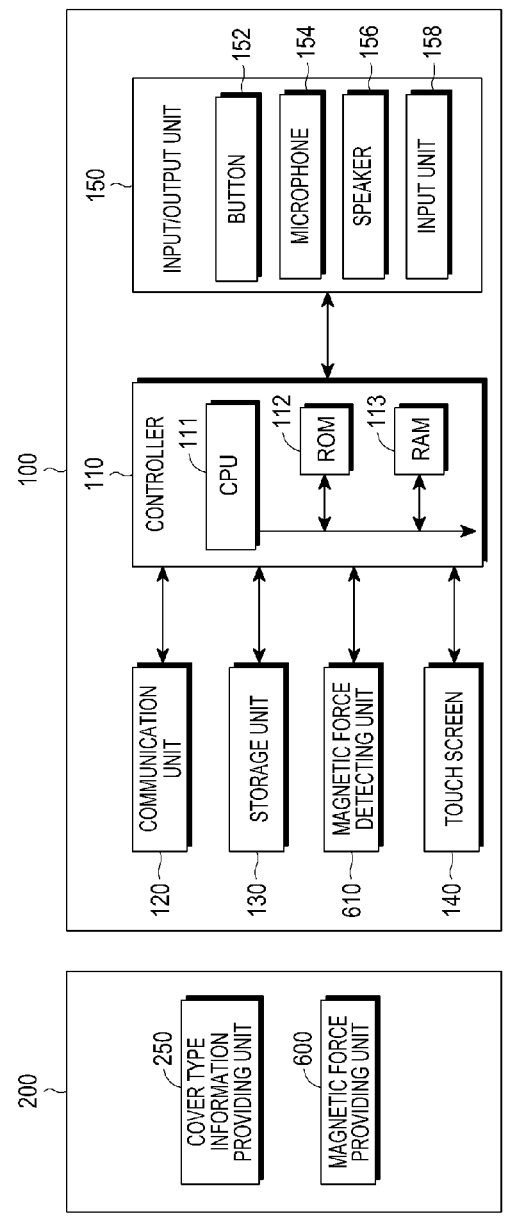

[Fig. 16b]
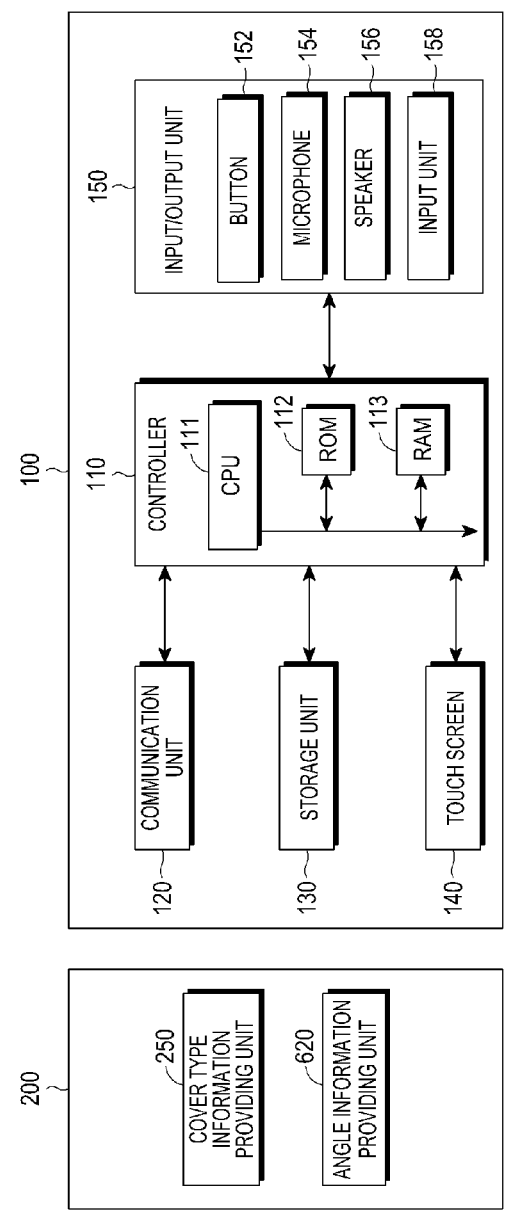

[Fig. 17]
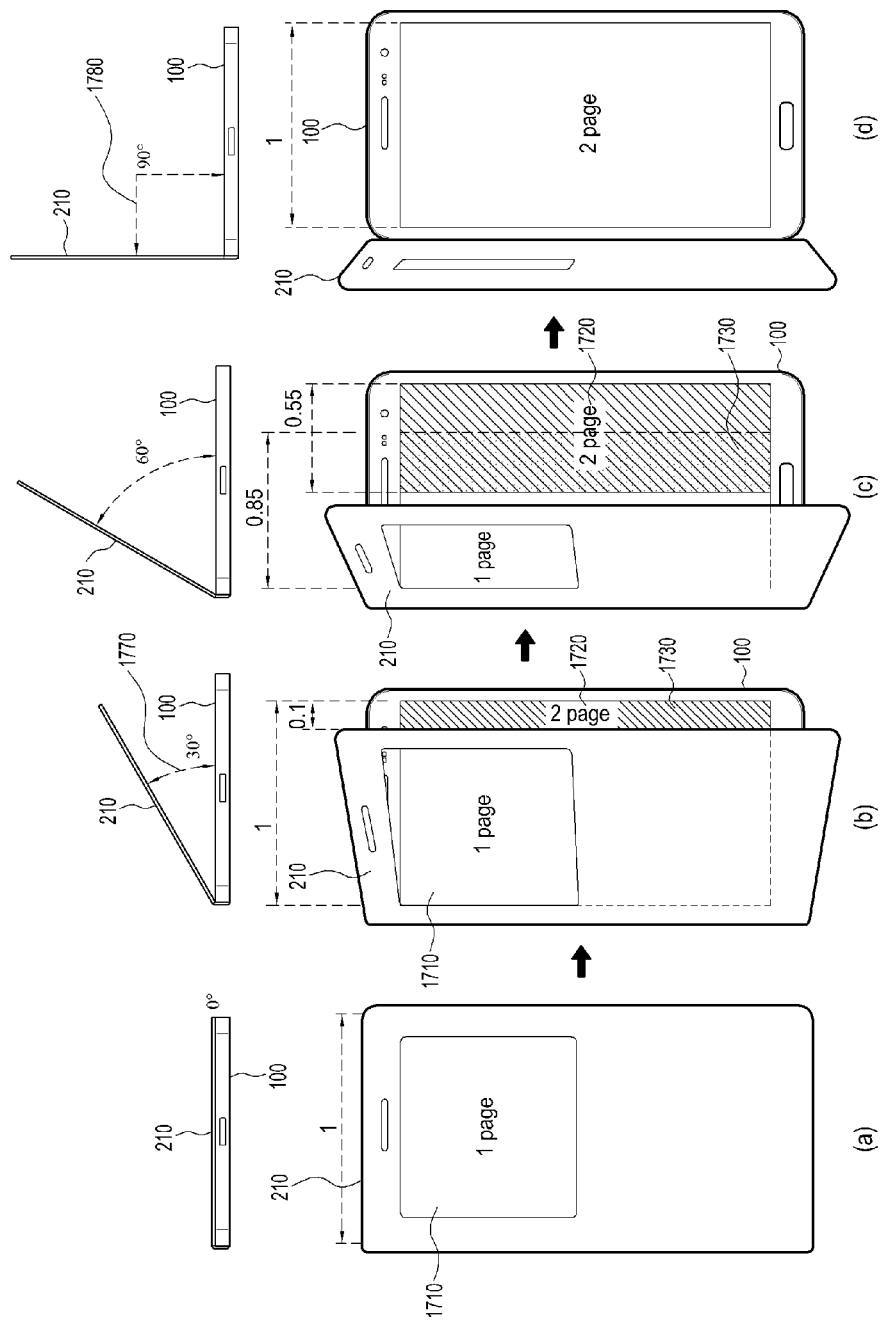

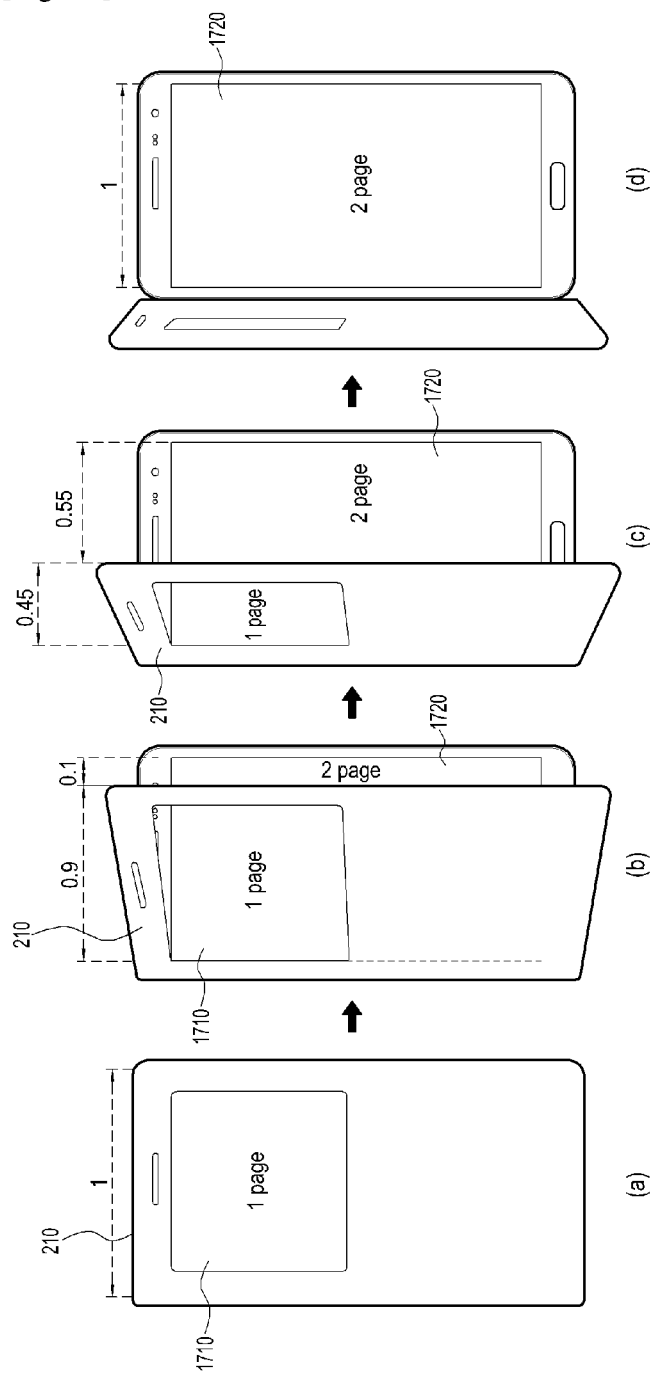
[Fig. 18]

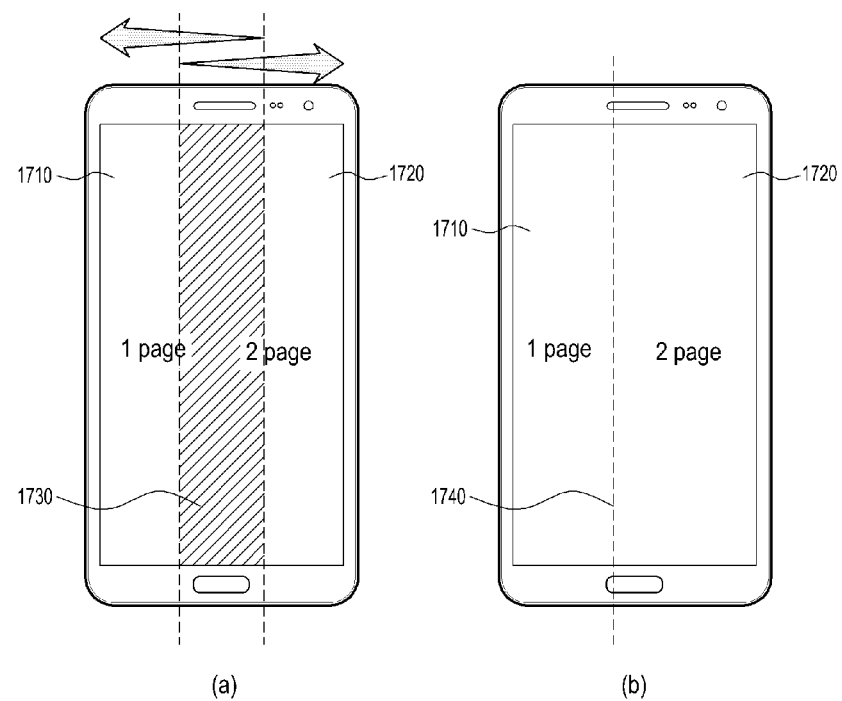
[Fig. 19]

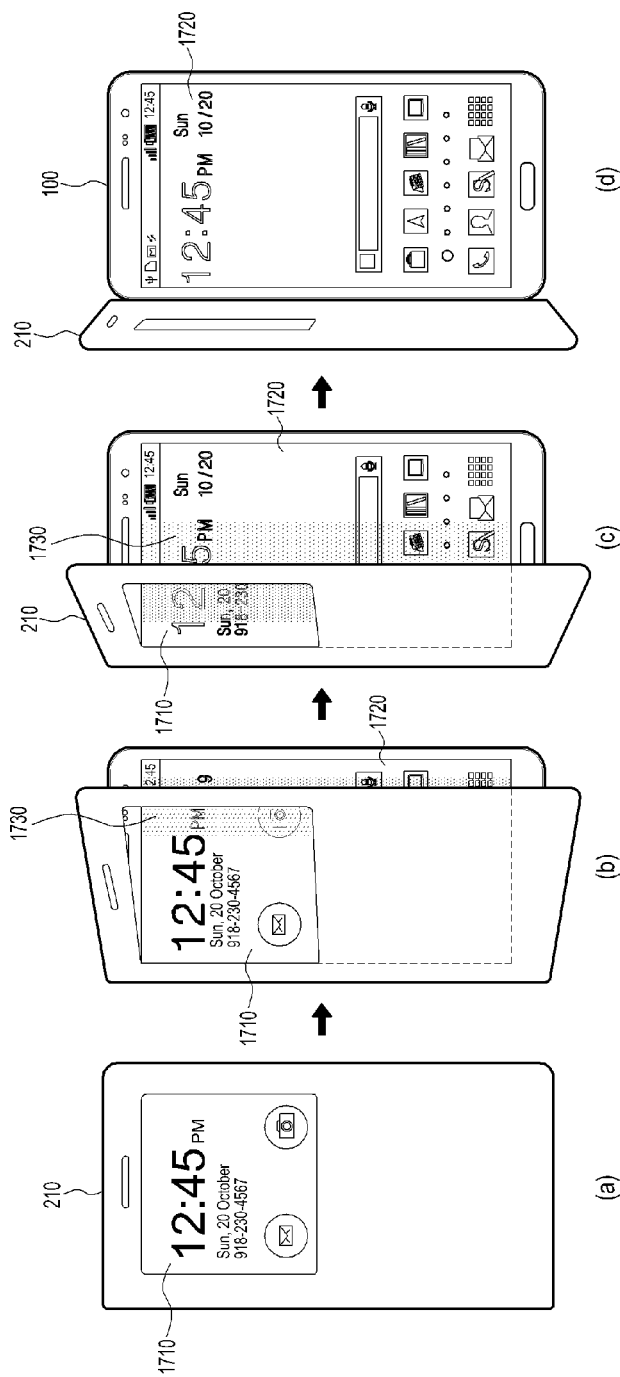
[Fig. 20]

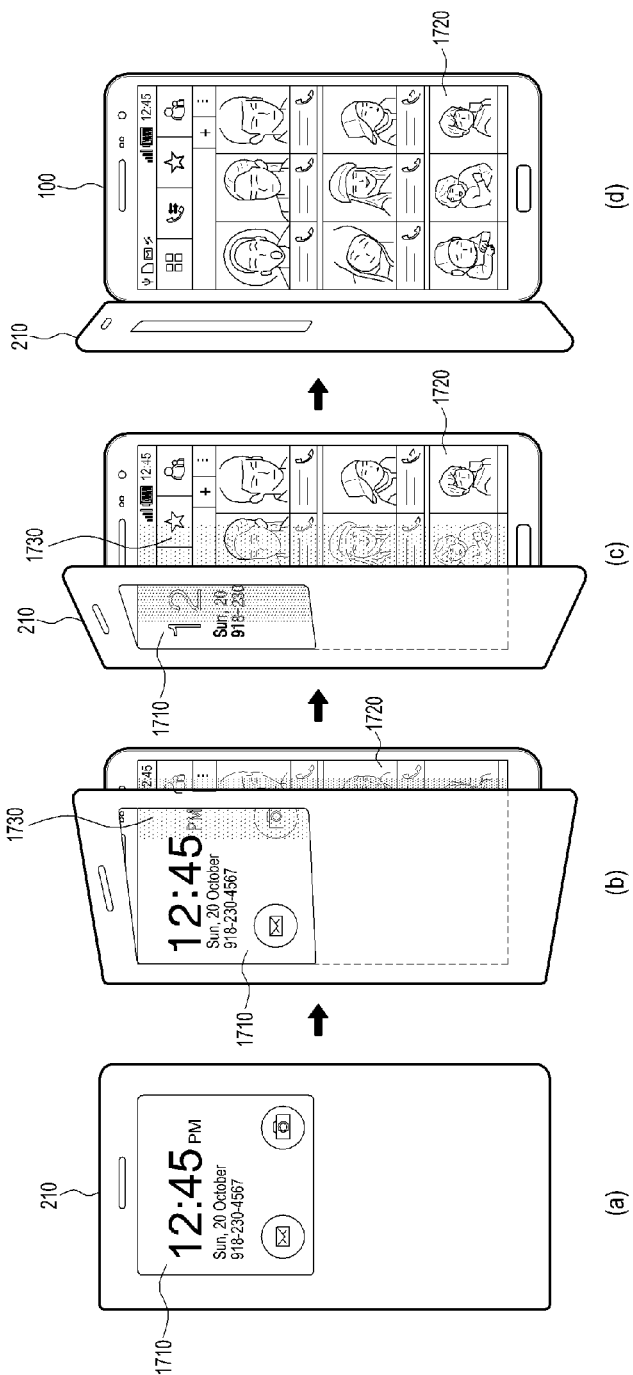
[Fig. 21]

[Fig. 22]
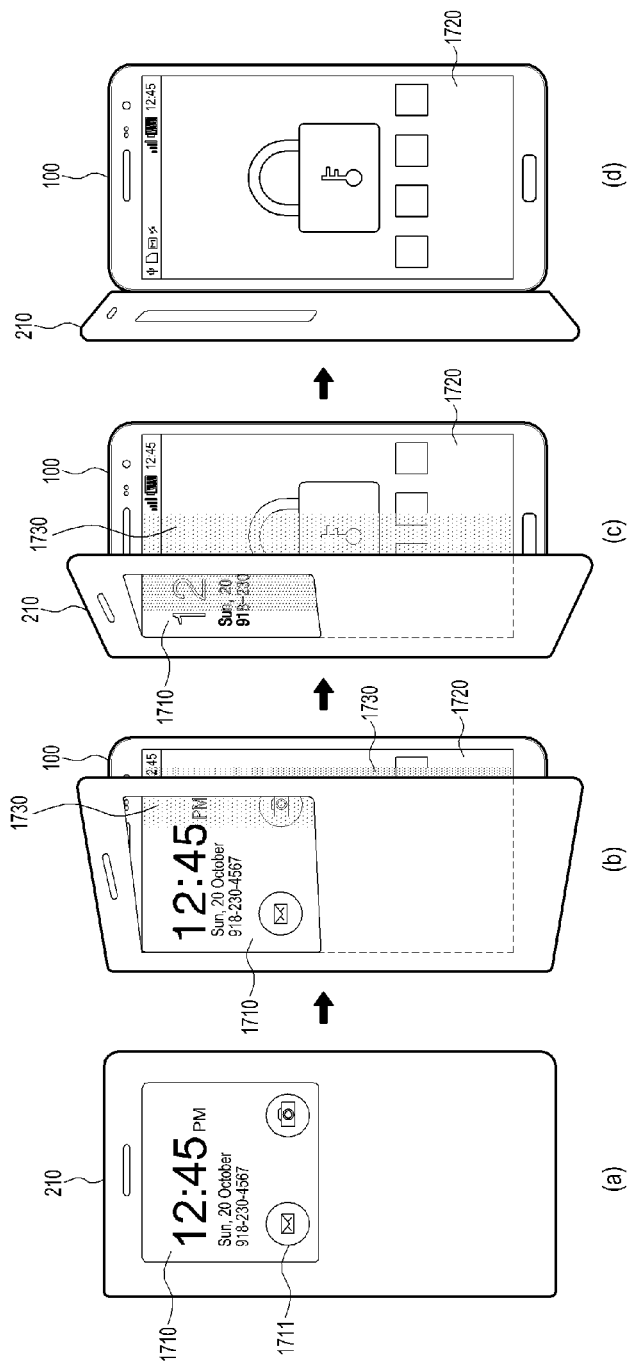

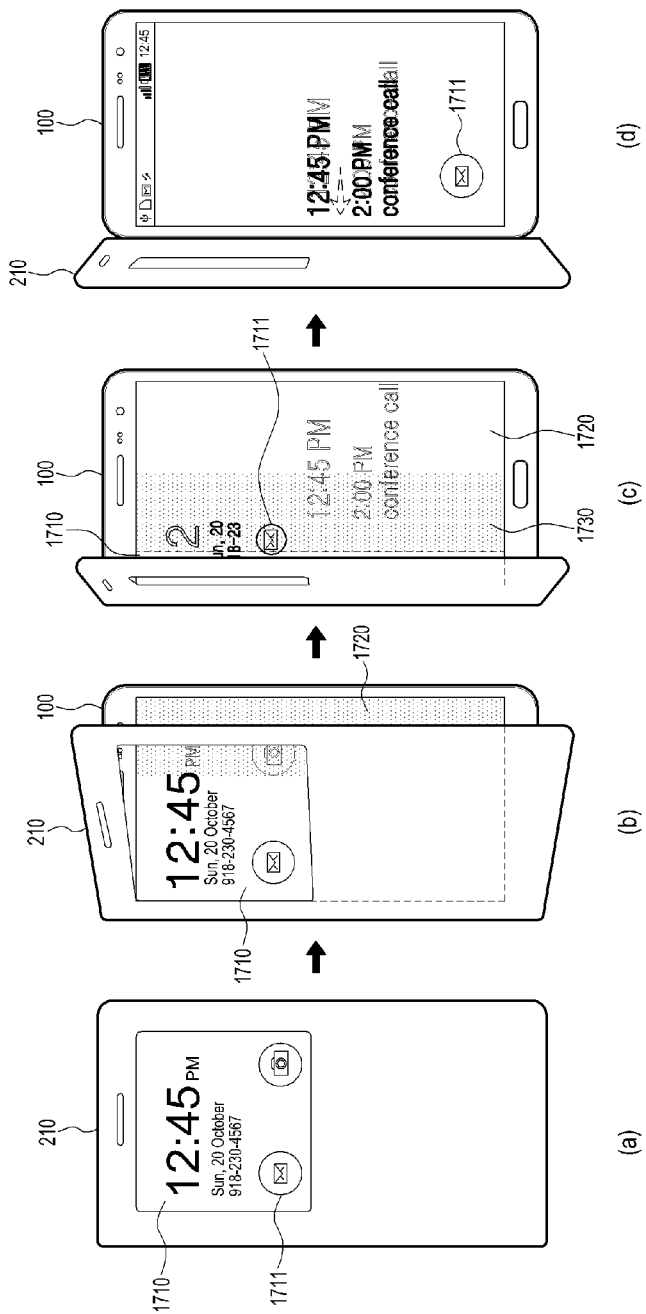

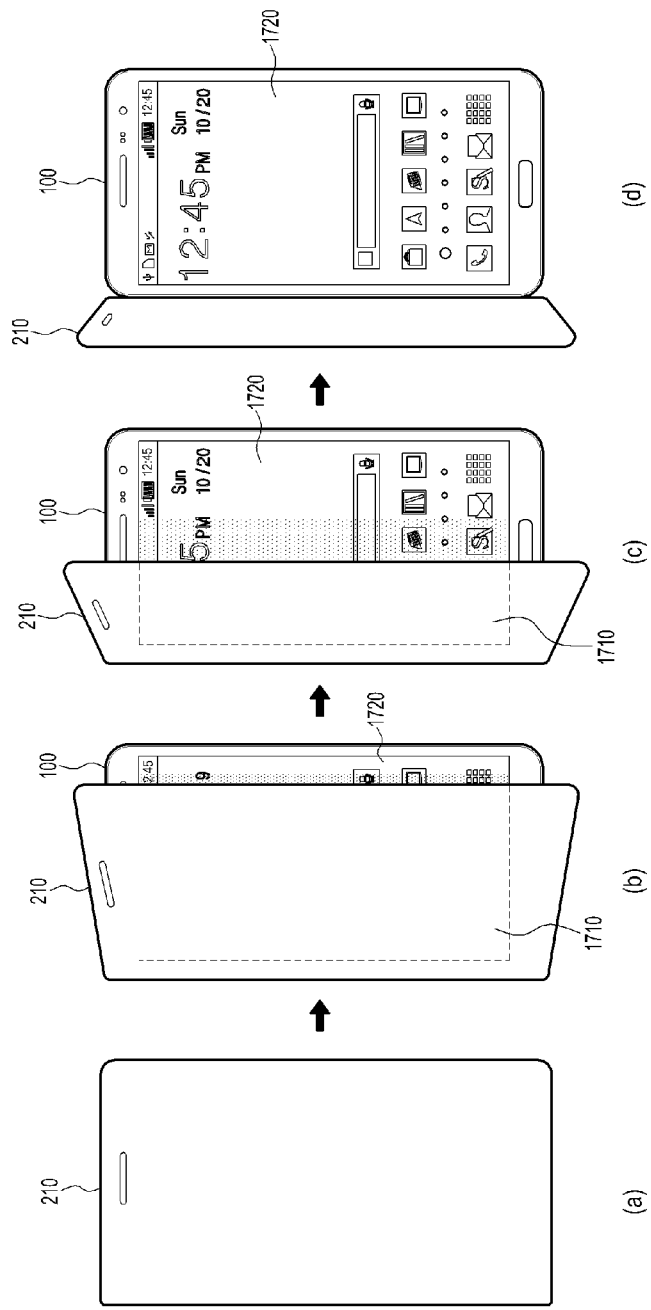
[Fig. 24]

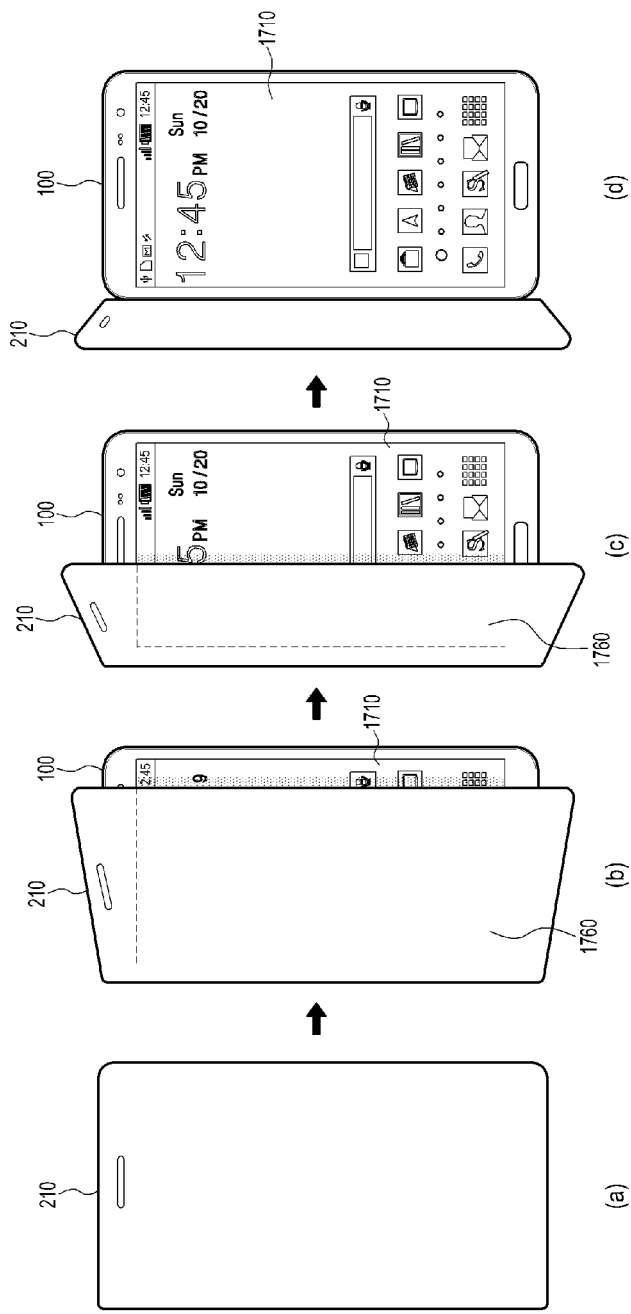
[Fig. 25]

[Fig. 26]
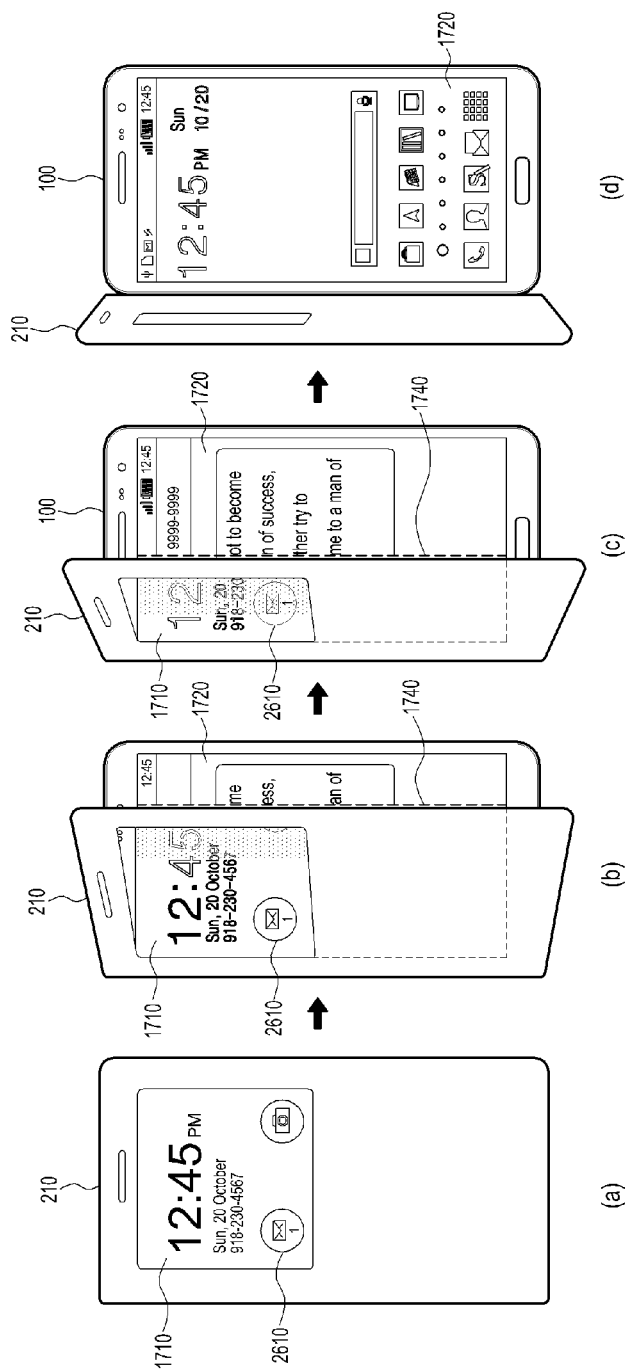

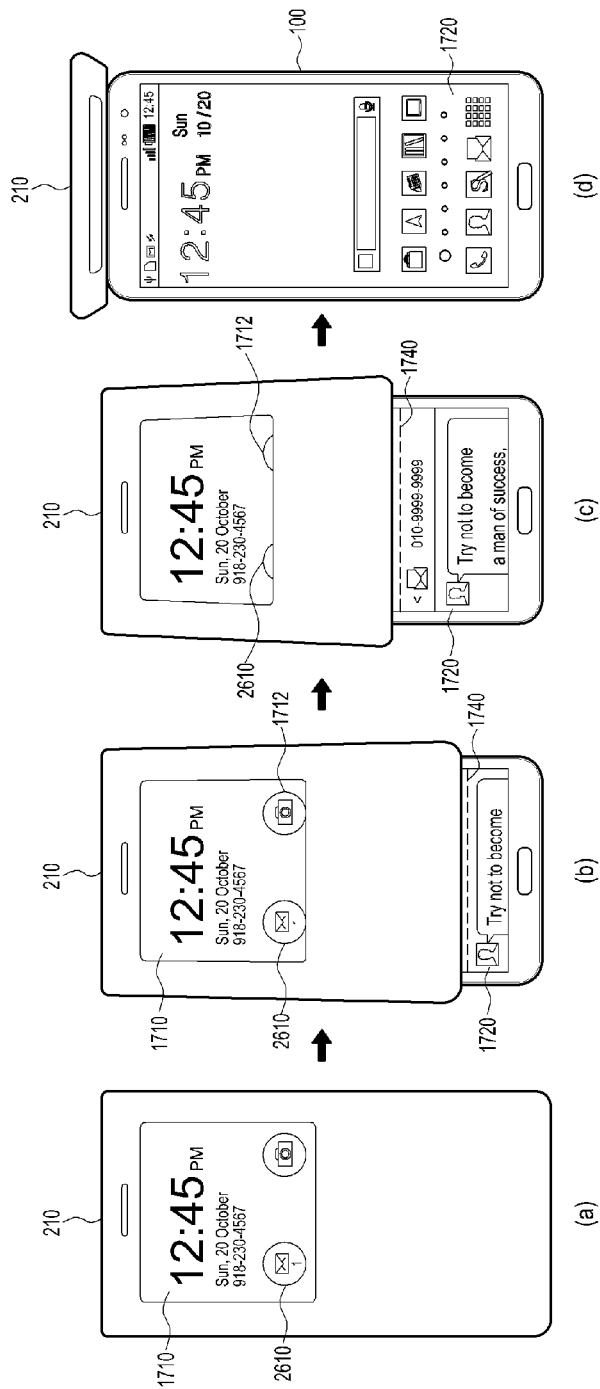
[Fig. 27]

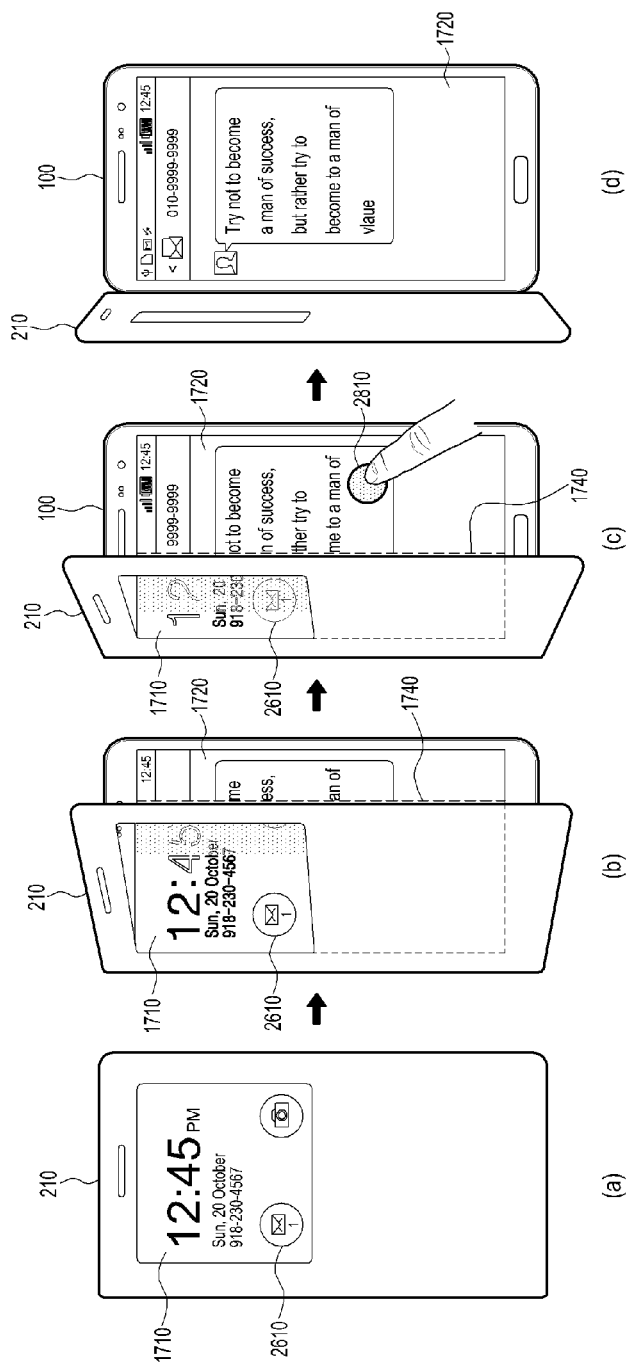
[Fig. 28]

[Fig. 29]
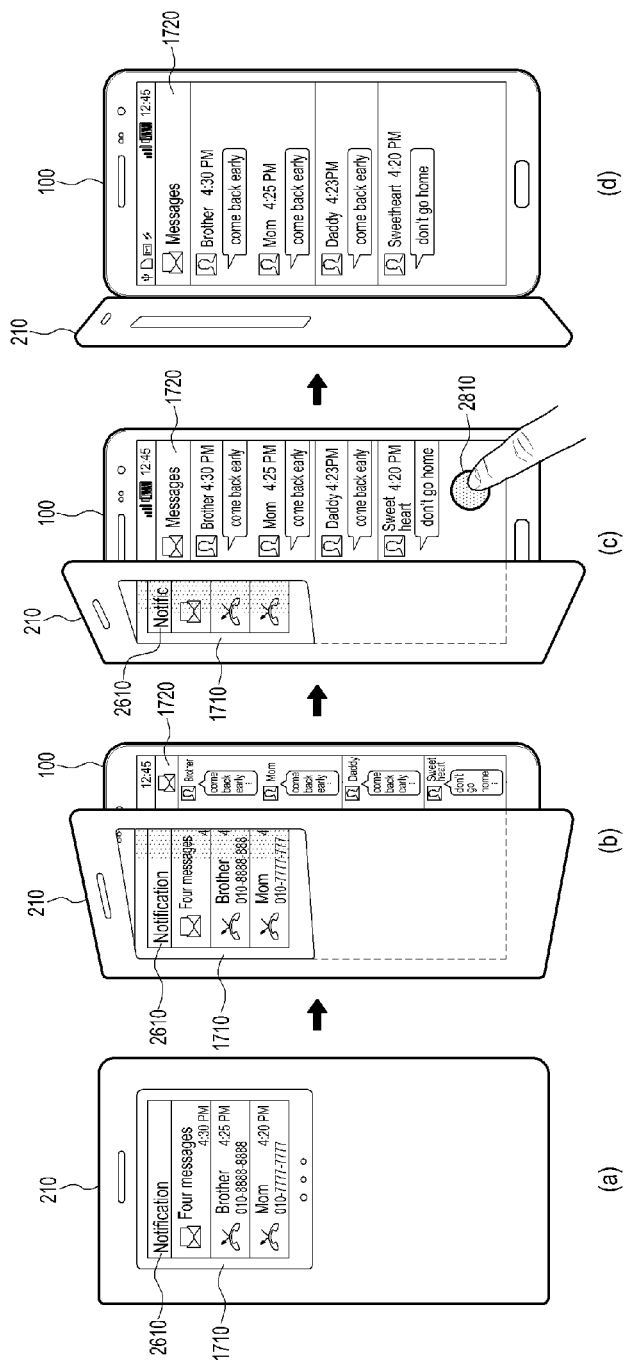

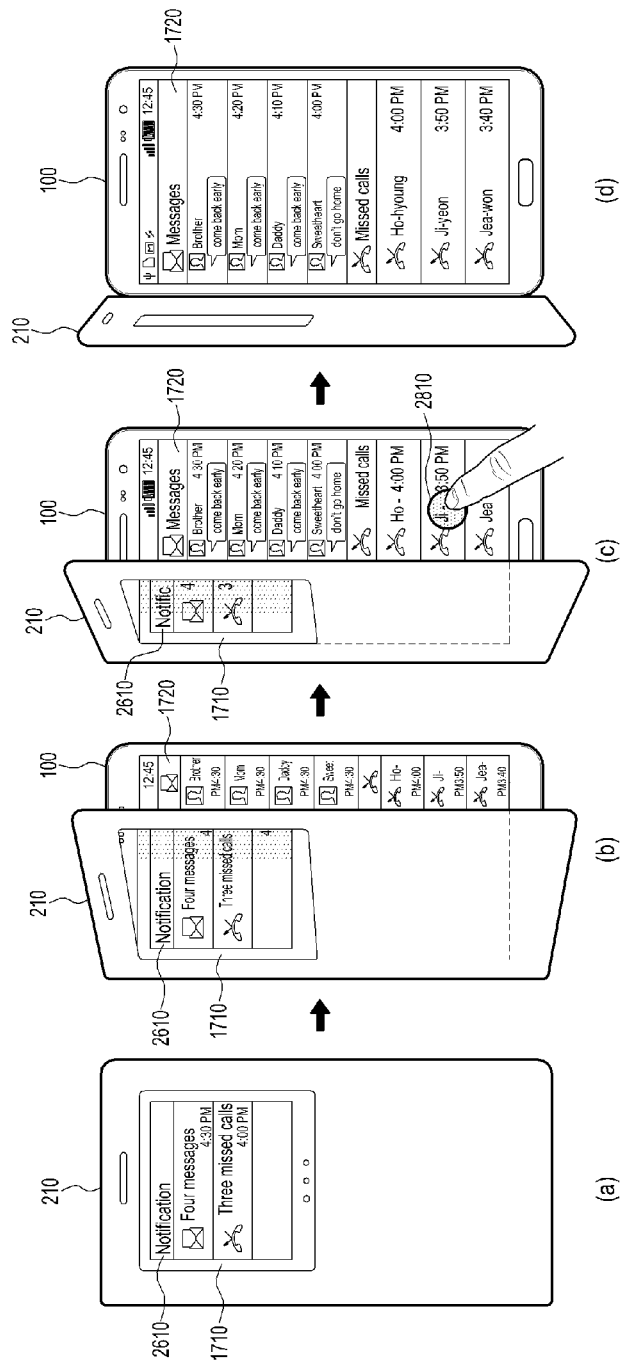
[Fig. 30]

[Fig. 31]
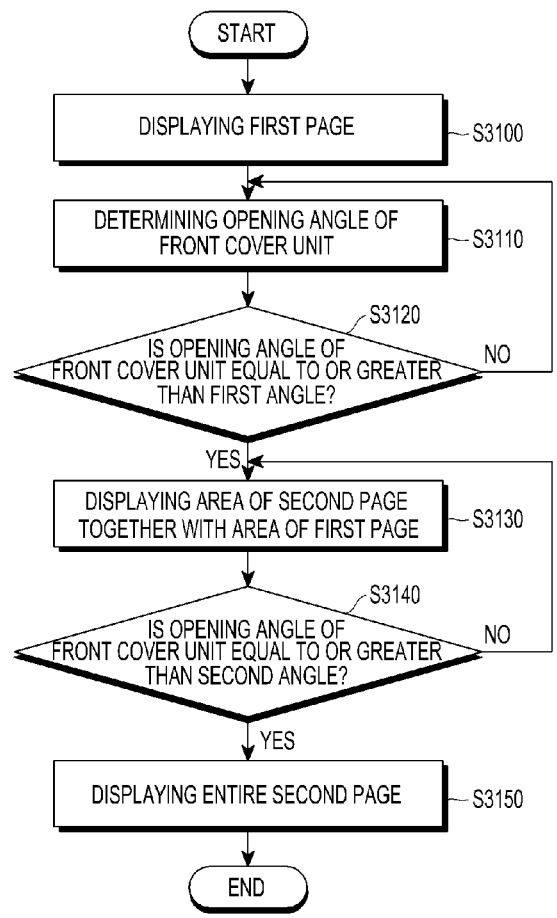

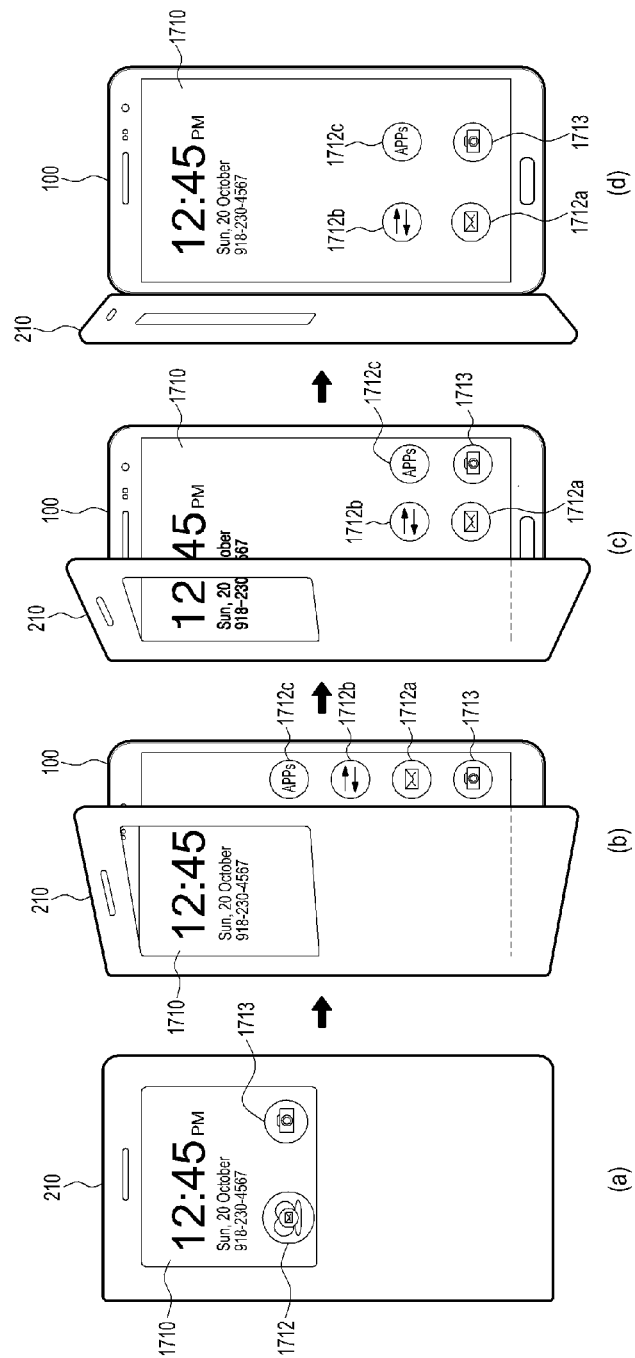
[Fig. 32]

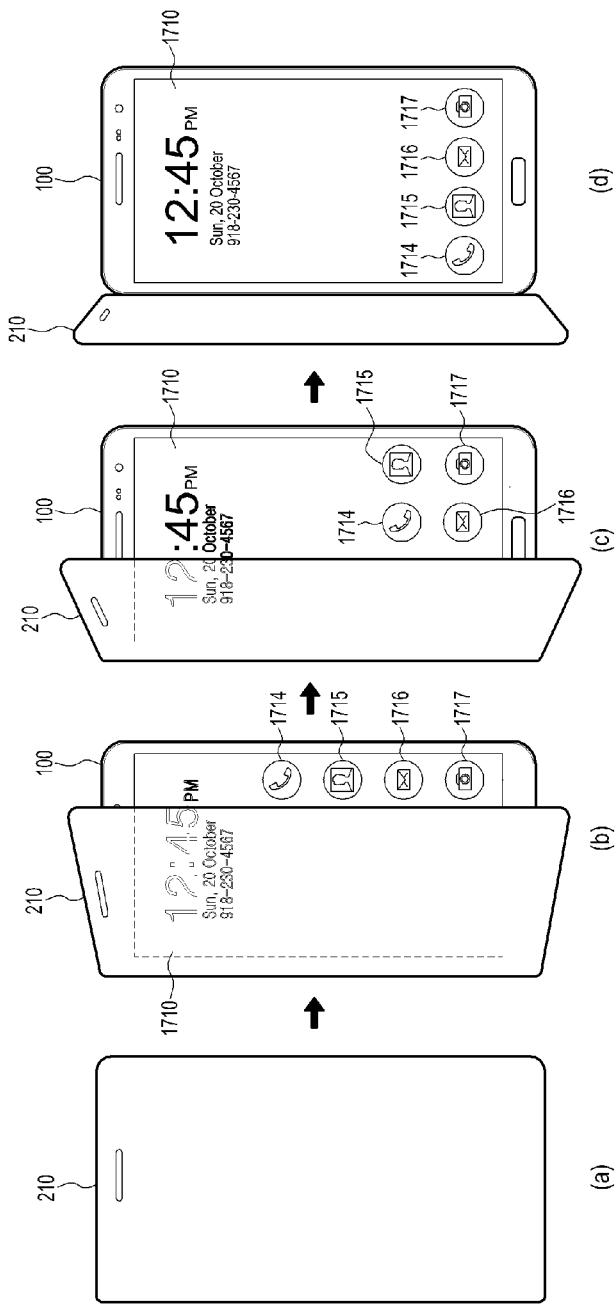
[Fig. 33]

[Fig. 34]
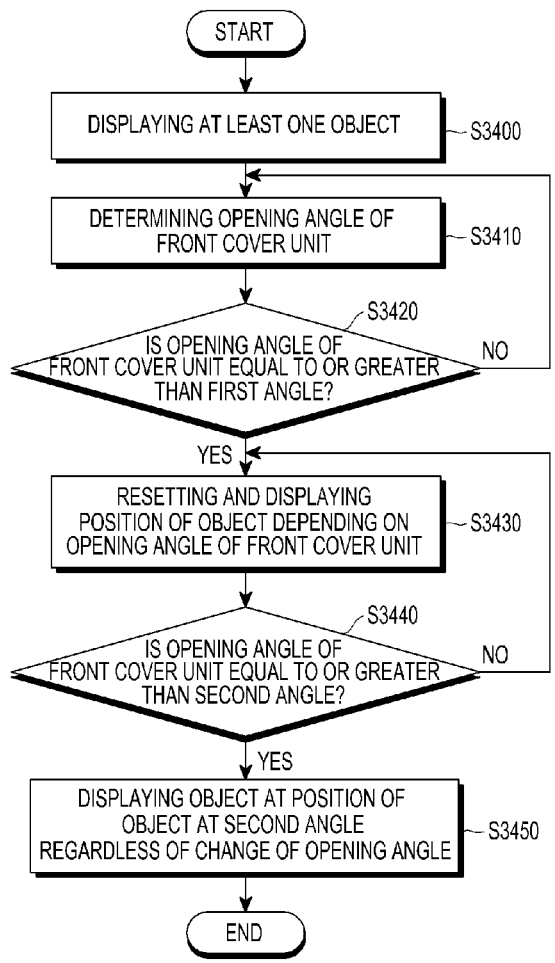

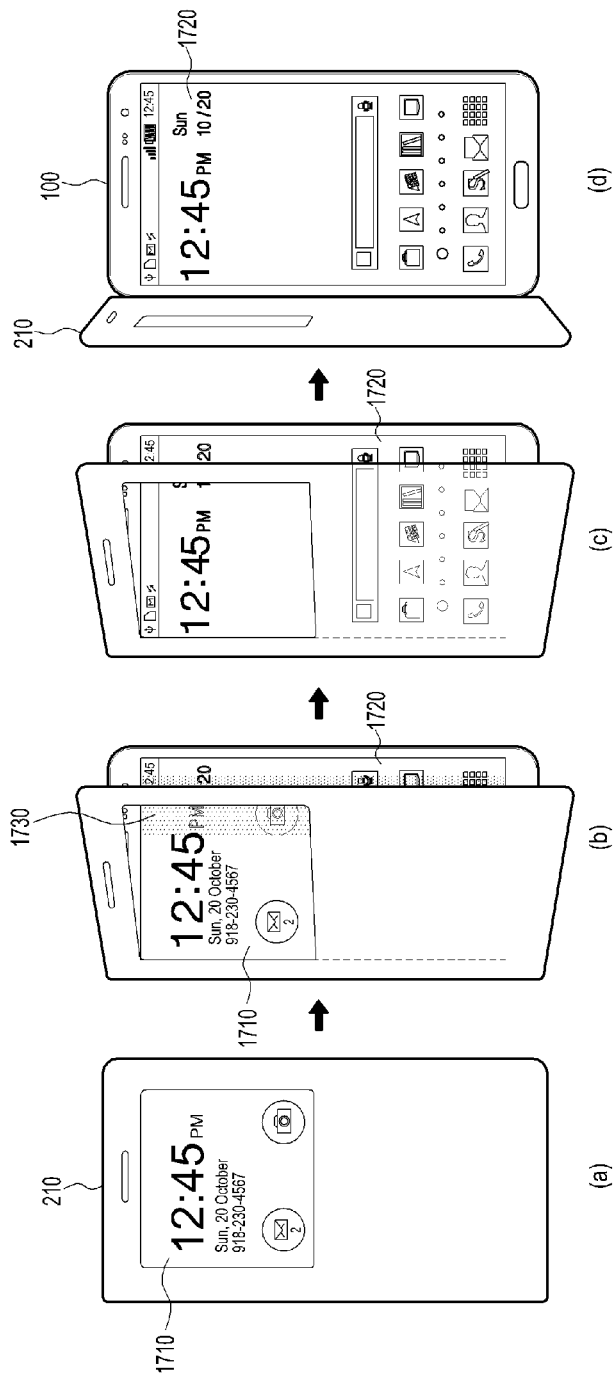
[Fig. 35]

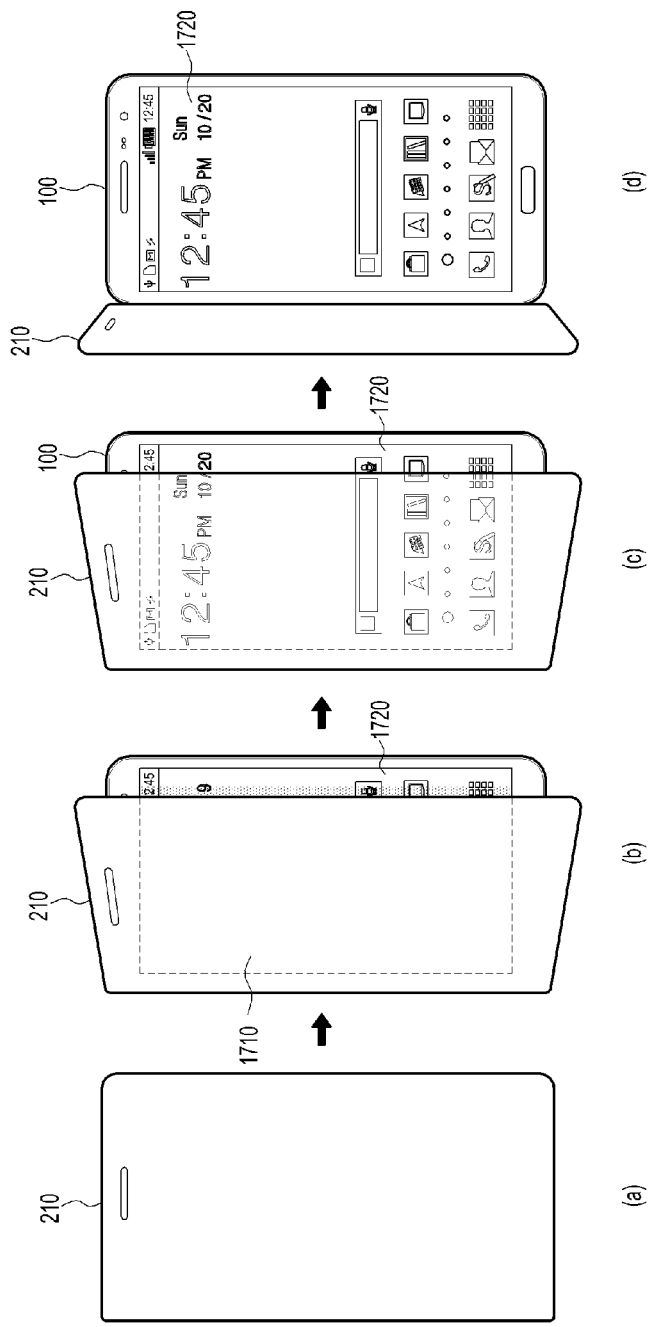

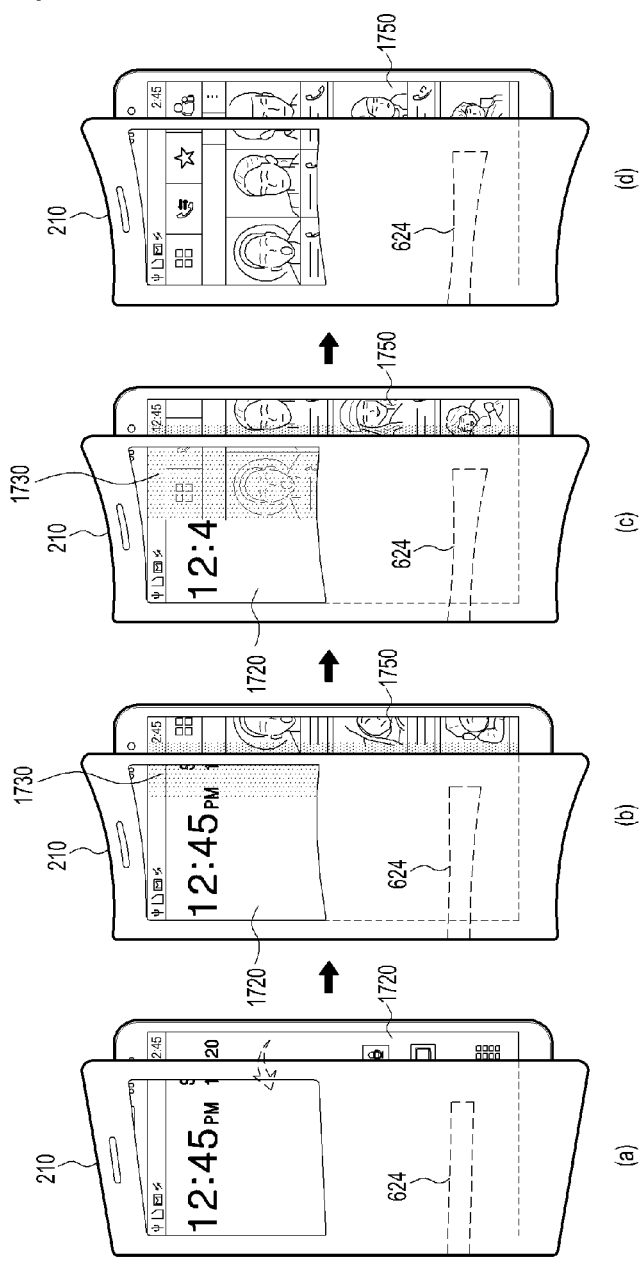
[Fig. 37]

[Fig. 38]
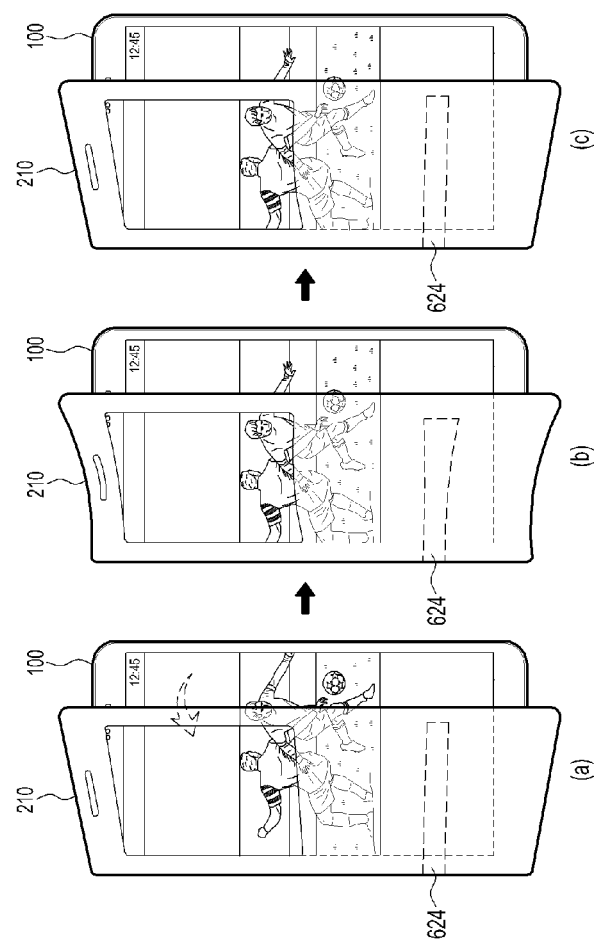

MOBILE TERMINAL AND METHOD OF PROVIDING A PAGE AND/OR OBJECT LAYOUT

PRIORITY

This application is a National Phase Entry of PCT International Application No. PCT/KR2014/011128, which was filed on Nov. 19, 2014, and claims priority to Korean Patent Application No. 10-2014-0001365, which was filed on Jan. 6, 2014, the contents of each of which are incorporated herein by reference.

TECHNICAL FIELD

The present invention relates generally to a mobile terminal and a method of controlling the same.

BACKGROUND ART

A mobile terminal such as a smartphone, a personal computer, a tablet PC and the like provides various useful functions, through various applications, to a user. The mobile terminal has evolved into a device which provides not just a voice call function, but also various kinds of information can be used through a variety of services provided by the device. Additionally, the mobile terminal is provided along with a cover for protecting the mobile terminal, and a user covers the mobile terminal with the cover, so as to protect the mobile terminal. Recently, in order to prevent damage to the mobile terminal, demand for the cover of the mobile terminal has rapidly increased.

DISCLOSURE OF INVENTION

Technical Problem

However, the mobile terminal, according to conventional art, has a problem in that the use of a cover does not improve user convenience. That is, the mobile terminal has a problem in that it is unable to perform an operation/function corresponding to an opening of a cover when a user opens the cover, since the mobile terminal and the cover do not interact with each other.

Further, the mobile terminal, according to the conventional art, has a problem in that it provides a user with a User Interface (UI) for the purpose of simply transmitting information without consideration of a emotional satisfaction of a user for the UI displayed on the mobile terminal according to an operation of a cover.

Solution to Problem

The present invention has been made to address at least the above-described problems and disadvantages in the conventional art, and to provide at least the advantages described below.

In accordance with an aspect of the present invention, a mobile terminal is provided. The mobile terminal includes a touch screen and a controller which determines an opening angle of a front cover unit of the mobile terminal. The opening angle is an angle between the mobile terminal and a front cover unit included in a cover connected to the mobile terminal. The controller displays one or more pages on the touch screen, where each page is displayed at a proportion determined based on the opening angle.

In accordance with another aspect of the present invention, a mobile terminal is provided. The mobile terminal includes a touch screen which displays at least one object and a controller which determines an opening angle of a front cover unit of the mobile terminal. The opening angle is the angle between the mobile terminal and the front cover unit included in a cover connected to the mobile terminal. The controller resets a display position of the at least one object based on the opening angle, and rearranges the at least one object on the touch screen depending on the reset display position.

In accordance with still another aspect of the present invention, a method of controlling a mobile terminal is provided. The method includes determining an opening angle of a front cover unit of the mobile terminal, wherein the opening angle is the angle between the mobile terminal and the front cover unit, and displaying at least one page, where the at least one page is displayed at a proportion determined based on the opening angle.

In accordance with still another aspect of the present invention, a method of controlling a mobile terminal is provided. The method includes displaying at least one object, determining an opening angle of a front cover unit of the mobile terminal, wherein the opening angle is the angle between the mobile terminal and the front cover unit, and resetting a display position of the at least one object depending on the opening angle, and rearranging the at least one object on the display based on the reset display position.

In accordance with still another aspect of the present invention, a mobile terminal is provided. The mobile terminal includes a touch screen which displays a first page, and a controller which controls to display the first page and a second page based on a bending angle of a front cover unit included in a cover connected to the mobile terminal when the bending angle is greater than or equal to a predetermined angle.

In accordance with still another aspect of the present invention, a mobile terminal is provided. The mobile terminal includes a touch screen which displays a first page, and a controller which controls to display the first page by scrolling based on a bending angle and a direction of a front cover unit included in a cover connected to the mobile terminal when the bending angle is greater than or equal to a predetermined angle.

Advantageous Effects of Invention

Accordingly, an aspect of the present invention is to provide a mobile terminal and a method of controlling the same, which are capable of displaying a first page and a second page together based on an opening angle of a front cover unit of the mobile terminal, and providing a page layout through which a user feels a emotional satisfaction.

BRIEF DESCRIPTION OF DRAWINGS

The above and other aspects, features, and advantages of the present invention will be more apparent from the following detailed description taken in conjunction with the accompanying drawings, in which:

FIG. 1 illustrates a perspective view of a mobile terminal having a cover, according to an embodiment of the present invention;

FIG. 2 illustrates a front and rear cover of a mobile terminal, according to an embodiment of the present invention;

FIG. 3 illustrates a rear surface of a mobile terminal and a cover of the mobile terminal, according to an embodiment of the present invention;

FIG. 4 illustrates a variety of covers for connecting to a mobile terminal, according to an embodiment of the present invention;

FIGS. 5 to 11 illustrate an operation of determining an opening angle of a cover, based on an intensity of a magnetic force, according to various embodiments of the present invention;

FIGS. 12 to 15 illustrate an operation of determining an opening angle of a cover, based on information provided by flexible sensors, according to various embodiments of the present invention;

FIGS. 16a and 16b are block diagrams of a mobile terminal and a cover of a mobile terminal, according to various embodiments of the present invention;

FIG. 17 illustrates a layout of a first page and a second page displayed on a mobile terminal, based on an opening angle of a cover, according to a first embodiment of the present invention;

FIG. 18 illustrates a layout of a first page and a second page displayed on a mobile terminal, based on an opening angle of a cover, according to a second embodiment of the present invention;

FIG. 19 provides a comparative view of a first page and a second page displayed on a mobile terminal, according to the first and second embodiments of the present invention;

FIGS. 20 to 22 illustrate examples of a first page and a second page displayed on a mobile terminal, based on an opening angle of a cover, according to the first embodiment of the present invention;

FIG. 23 illustrates objects of a second page displayed on a mobile terminal, gradually being displayed and moved in a direction in which a cover opens as the cover opens, according to an embodiment of the present invention;

FIGS. 24 and 25 illustrate a black screen and a page displayed on a mobile terminal, based on an opening angle of a cover, according to an embodiment of the present invention;

FIGS. 26 and 27 illustrate a display of detailed contents of a notification event on a page of a mobile terminal, based on an opening angle and direction of a cover, according to an embodiment of the present invention;

FIG. 28 illustrates a display of detailed contents of a notification event on a second page of a mobile terminal, based on a touch event of a user, according to an embodiment of the present invention;

FIGS. 29 and 30 illustrate a display of detailed contents of various types of notification events on a page of a mobile terminal, based on an opening angle of a cover, according to an embodiment of the present invention;

FIG. 31 is a flowchart illustrating a process of controlling a mobile terminal to display a first page and a second page on a mobile terminal, based on an opening angle of a cover, according to an embodiment of the present invention;

FIGS. 32 and 33 illustrate the display and rearrangement of objects displayed on a page of the mobile terminal, based on an opening angle of a cover, according to an embodiment of the present invention;

FIG. 34 is a flowchart illustrating a process of controlling a mobile terminal to display and rearrange the positions of objects on a page on a mobile terminal, based on an opening angle of a cover, according to various embodiments of the present invention;

FIGS. 35 and 36 illustrate a cover in which a first page is converted to a second page on a mobile terminal, based on an opening angle of a cover as compared to a first angle, according to various embodiments of the present invention;

FIG. 37 illustrates the display of a first, second, and third page on a mobile terminal, based on a bent angle of a cover, according to an embodiment of the present invention; and FIG. 38 illustrates scrolling of a page on a mobile terminal, based on a bent angle of a cover, according to an embodiment of the present invention.

MODE FOR THE INVENTION

Various example embodiments will now be described more fully with reference to the accompanying drawings in which some example embodiments are shown. However, the embodiments do not limit the present invention to a specific implementation, but should be construed as including all modifications, equivalents, and replacements included in the spirit and scope of the present invention.

Although the terms including an ordinal number such as first, second, etc. can be used for describing various elements, the elements are not restricted by the terms. The terms are only used to distinguish one element from another element. For example, without departing from the scope of the present invention, a first structural element may be referred to as a second structural named. Similarly, the second structural element also may be referred to as the first structural element. As used herein, the term "and/or" includes any and all combinations of one or more of the associated listed items.

The terms used in this application are for the purpose of describing particular embodiments only and are not intended to limit the invention. Singular forms are intended to include plural forms unless the context clearly indicates otherwise. In the description, it should be understood that the terms "include" or "have" indicate existences of a feature, a number, a step, an operation, a structural element, parts, or a combination thereof, and do not exclude the existences or probability of addition of one or more another features, numeral, steps, operations, structural elements, parts, or combinations thereof.

Unless defined differently, all terms used herein, which include technical terminologies or scientific terminologies, have the same meaning as a person skilled in the art to which the present invention belongs would understand them to have. It should be interpreted that the terms, which are identical to those defined in general dictionaries, have the meaning identical to that in the context of the related technique. The terms should not be ideally or excessively interpreted as a formal meaning.

The mobile terminal according to the various embodiments of the present invention is an electronic device which has a display unit, e.g., a touch screen, on which a cover is positioned. The electronic device of the present invention includes devices such as a video phone, a portable phone, a smart phone, an International Mobile Telecommunication (IMT) 2000 terminal, a Wideband Code Division Multiple Access (WCDMA) terminal, a Universal Mobile Telecommunication Service (UMTS) terminal, a Personal Digital Assistant (PDA) terminal, a Portable Multimedia Player (PMP), a Digital Multimedia Broadcasting (DMB) terminal, an E-book reader, a portable computer such as a laptop computer, a tablet PC, a digital camera, and the like.

FIG. 1 illustrates a front surface of a mobile terminal having a cover, according to an embodiment of the present invention.

Referring to FIG. 1, the mobile terminal 100 is coupled with a cover 200. The mobile terminal 100 has a display unit, e.g., a touch screen 140, on a front surface of the mobile terminal 100, for displaying various multi-functions, and a battery 170 on a rear surface of the mobile terminal 100, for supplying the mobile terminal 100 with electricity, as shown in FIG. 3. Further, the mobile terminal 100 is provided with a connection terminal 180, on the rear surface of the mobile terminal 100 which is electrically connected to a rear cover unit 220, as shown in FIG. 3, described later. The cover 200 may cover all the front surface and rear surface of the mobile terminal 100, or only the front surface of the mobile terminal 100. When the cover 200 covers the front surface of the mobile terminal, the cover 200 may cover an entire screen of the touch screen 140, or a part of the screen of the touch screen 140 so that the other parts are exposed. On the exposed parts of the touch screen 140, contents such as a clock, a message, numbers, a received phone number, or a user environment may displayed.

The cover 200 has a configuration in which a front cover unit 210 may be open with respect to the display unit, e.g., the touch screen 140, of the mobile terminal 100, as shown in (a) of FIG. 1, or may be closed and cover the touch screen 140 of the mobile terminal 100, as shown in FIG. 1B. The cover 200 includes a cover connecting portion 230 for connecting the front cover unit 210 to the rear cover unit 220, and includes a window area 212 on the front cover unit 210.

FIG. 2 illustrates a front and rear cover of a mobile terminal, according to an embodiment of the present invention; and FIG. 3 illustrates a rear surface of a mobile terminal and a cover of the mobile terminal, according to an embodiment of the present invention.

Referring to FIGS. 2 and 3, the cover 200 includes the front cover unit 210, the rear cover unit 220 and the cover connecting portion 230.

The front cover unit 210 may entirely cover the front surface of the mobile terminal 100, and is provided with a window area 212 through which the entire screen or a part of the screen of the touch screen 140 is exposed. The window area 212 is made of a transparent material or a semi-transparent material, or is formed in the form of an opening so that a user can visually identify the touch screen 140 when the cover 200 covers the front surface of the mobile terminal 100. For example, the window area 212 is a window made of a transparent material or a semi-transparent material, or a cutout open window. In the case that the window area 212 is made of transparent material or semi-transparent material, the window area 212 is preferably made of a conductive material, particularly a material such as conductive silicon. Thus, when a user inputs a touch on the window area 212, the mobile terminal 100 can detect the touch input. The user can visually identify the touch screen 140 located inside of the window area 212. The user can identify and execute contents displayed on the touch screen 140, for example, brief contents such as weather, data, time, a received message, a phone number according to a voice call, a user environment set by the user, and the like, through the window area 212.

The rear cover unit 220 covers the rear surface of the mobile terminal 100, is seated and fixed to the rear surface of the mobile terminal 100, and is connected at a side to the front cover unit 210 through the cover connecting portion 230. The cover connecting portion 230 physically connects the front cover unit 210 to the rear cover unit 220. The rear cover unit 220 has a bent shape with enclosing sides of the mobile terminal 100 so that the mobile terminal 100 is seated inside of the rear cover unit 220 without a separation from the rear cover unit 220. Such a rear cover unit 220 is provided with a connecter 202 engaged with and electrically connected to a connecting terminal 180 mounted on the rear surface of the mobile terminal 100. A plurality of connecting terminals 180 are provided and mounted on the rear surface of the mobile terminal 100, and the connector 202 is engaged with and electrically connected to at least one of the plurality of connecting terminals 180. Through the connecting terminal 180 electrically connected to the connector 202, information related to the cover 200 such as information related to a type of the cover 200 connected to the mobile terminal 100 is transmitted and received.

FIG. 4 illustrates a variety of covers for connecting to a mobile terminal, according to an embodiment of the present invention.

Referring to (a) of FIG. 4, the cover 200 includes a window area 212 and a non-window area 214. In some embodiments to which the cover 200 is applied, the cover 200 is made of a material which can be flexible by a predetermined external force.

Referring to (b) of FIG. 4, the cover 200 includes connecting portions 216 in order for a user to fold and stack the front cover unit 210. In (b) of FIG. 4, two connecting portions 216 are shown, but they are merely examples. For example, the cover 200 may have one connecting portion or three connecting portions 216.

Referring to (c) of FIG. 4, the cover 200 is made to have only the non-window area 214 by excluding the window area 212.

The types of the covers shown in FIG. 4 are merely examples, and it will be obvious to those skilled in the art that various types of covers may be used in the mobile terminal 100.

FIGS. 5 to 11 illustrate an operation of determining an opening angle of a cover, based on an intensity of a magnetic force, according to various embodiments of the present invention.

Referring to FIGS. 5, 6, and 7, the front cover unit 210 includes a magnetic force providing unit 600. A magnetic force detecting unit 610 of the mobile terminal 100 detects an intensity of the magnetic force, and controller 110 determines an angle at which the front cover unit 210 is opened, on the basis of the intensity of the detected magnetic force.

Referring to FIGS. 8, 9, 10, and 11, FIGS. 8 and 9 illustrate the determination of various opening angles of the front cover unit 210 shown in (a) of FIG. 4, based on the intensity of the magnetic force, while FIGS. 10 and 11 illustrate the determination of various opening angles of the front cover unit 210 shown in (b) of FIG. 4, based on the intensity of the magnetic force. As the intensity of the magnetic force which the magnetic force detecting unit 610 of the mobile terminal 100 detects becomes weaker as the distance between the magnetic force providing unit 600 of the front cover unit 210 and the magnetic force detecting unit 610 of the mobile terminal 100 increases. Thus, the controller 110 determines the angle at which the front cover unit 210 is opened, based on the intensity of the magnetic force. The controller 110 determines the angle with reference to a mapping table which is predetermined in correspondence to the intensity of the magnetic force which the magnetic force detecting unit 610 detects. A sensor included in the magnetic force detecting unit 610 is a hall sensor. A block diagram related to an embodiment using the magnetic force providing unit 600 will be described below in reference to FIG. 16a.

FIGS. 12 to 15 illustrate an operation of determining an opening angle of a cover, based on information provided by flexible sensors, according to various embodiments of the present invention.

Referring to FIGS. 12 to 15, according to another embodiment of the present invention, an opening angle of the cover is determined based on data provided by an angle information providing unit 620 integrated in the cover connecting portion 230.

In FIG. 12, an embodiment in which a flexible sensor 622 having a relatively short length is disposed on the cover 200 is shown.

The angle information providing unit 620 includes flexible sensors 622 and 624 capable of detecting a bending angle of the cover, as shown in FIG. 13. As shown in (a) of FIG. 13 and (d) of FIG. 13, the flexible sensors 624 and 622, respectively, preferably have a bar shape. As shown in (b) of FIG. 13 and (e) of FIG. 13, the flexible sensors 624 and 622, respectively, preferably have a bent shape.

The flexible sensors 622 and 624 have a structure in which they are electrically connected to an element or elements included in the cover 200, as shown in (c) of FIG. 13. As shown in (a), (b), (d) and (e) of FIG. 13, the flexible sensors 622 and 624 may be modified to have different lengths. Preferably, the flexible sensor 622 having the relatively short length is disposed on the cover connecting portion 230, and the flexible sensor 624 having the relatively long length is disposed on the front cover unit 210 according to the embodiment.

FIG. 14 illustrates the determination of various opening angles of the front cover unit 210 shown in (a) of FIG. 4, based on information provided by the flexible sensors, while FIG. 15 illustrates the determination of various opening angles of the front cover unit 210 shown in (b) of FIG. 4, based on information provided by the flexible sensors.

The flexible sensors 622 and 624 are sensors which detect a bent extent of the cover and an angle of the cover corresponding to the bent extent. Accordingly, when the cover 200 includes the flexible sensors 622 and 624, the mobile terminal 100 receives data with relation to the angle detected by the flexible sensors 622 and 624, so as to determine the open angle of the front cover unit 210. The data related to the angle detected by the flexible sensors 622 and 624 includes a predetermined value corresponding to the bent extent of the flexible sensors 622 and 624. The controller 110 receives the predetermined value corresponding to the bent extent of the flexible sensors 622 and 624, and determines the opening angle of the cover 200 based on the predetermined value. The angle information providing unit 620 may further include various elements and is electrically connected to another structural element of the cover 200, in order to provide the data related to the angle detected by the flexible sensors 622 and 624. A block diagram related to an embodiment using the angle information providing unit 620 will be described below in reference to FIG. 16b.

FIGS. 16a and 16b are block diagrams of a mobile terminal and a cover of a mobile terminal, according to various embodiments of the present invention.

Referring to FIG. 16a, in one embodiment of the present invention, the cover 200 includes a cover type information providing unit 250 and a magnetic force providing unit 600. The mobile terminal 100 receives information corresponding to a type of a cover from the cover type information providing unit 250, and the controller 110 determines the type of the cover on the basis of information corresponding to the type of the cover. The type of the cover 200 may refer to, for example, a presence or an absence of the window area, and a direction to which the front cover unit 210 is opened. When it is determined that the front cover unit 210 covers the mobile terminal, the controller 110 control to display a screen according to the determined type of the cover on the touch screen 140. According to the embodiment of the present invention described in reference to FIG. 16a, it is possible to determine whether the front cover unit 210 covers the mobile terminal 100 by using information on a change of intensity of a magnetic force detected by the magnetic force detecting unit 610. Referring to FIG. 16b, in another embodiment of the present invention, the cover 200 includes a cover type information providing unit 250 and a angle information providing unit 620. The cover type information providing unit 250 functions in the same manner as described above in reference to FIG. 16a. The angle information providing unit 620 includes, flexible sensors 622 and 624. According to the embodiment of the present invention described in reference to FIG. 16b, it is possible to determine whether the front cover unit 210 covers the mobile terminal based on the information on the angle obtained by the flexible sensors 622 and 624. Referring to FIGS. 16a and 16b, the mobile terminal 100 further includes a controller 110, a communication unit 120, a storage unit 130, a touch screen 140, and an input/output unit 150. Additionally, according to the embodiment of the present invention described in reference to FIG. 16a, the mobile terminal 100 also includes the magnetic force detecting unit 610.

The descriptions of the controller 110, the communication unit 120, the storage unit 130, the touch screen 140 and the input/output unit 150 are identically applied to the embodiment shown in both FIGS. 16a and 16b. The controller 110 is a Central Processor Unit (CPU) 111. The controller 110 may include a Digital Signal Processor (DSP) (not shown). The controller 110 includes a ROM 112, which stores a control program for a control of the mobile terminal 100, and a RAM 113, which stores signals or data input received externally from the mobile terminal 100, or which is used as a storage region for operations performed by the mobile terminal 100. The CPU 111 may include a single core type CPU, or a multi-core type CPU, such as a dual core type CPU, a triple core type CPU, and a quad core type CPU. The CPU, the RAM and the ROM are connected with each other through internal buses. The controller 110 controls the communication unit 120, the storage unit 130, the touch screen 140, and the input/output unit 150, and controls the magnetic force detecting unit 610 in the embodiment described in reference to FIG. 16a, if the angle of the cover is determined through a change of the intensity of the magnetic force. That is, the controller 110 performs an overall control function for the mobile terminal 100, and controls signal flows between the above-described structural elements.

The communication unit 120 may connect the mobile terminal 100 to an external device (not shown), and communicate with the external device. The external device includes a portable phone, a smartphone, a tablet PC and a server. The communication unit 120 may include various communication modules, such as a mobile communication module, a Near Field Communication (NFC) module, a Bluetooth communication module, and the like, and may communicate with the external device by using various of the communication modules. For example, the mobile terminal 100 may transmit/receive a radio signal for voice communication, video communication, a Short Message Service (SMS), or a Multimedia Message Service (MMS) to/from a portable phone, a smart phone, a tablet PC, or another device which has a phone number input to the mobile terminal 100, through the mobile communication module. Further, the mobile terminal 100 may receive information through the NFC module from the external device, or receive information through the Bluetooth communication module from the external device. According to the various embodiments of the present invention, the communication unit 120 may further include at least one wireless LAN module and other short-range communication modules, as well as the NFC module and the Bluetooth module, and may receive information through the at least one of wireless LAN module and the other short-range communication modules. The wireless LAN module connects to the Internet according to a control of the control unit 100 in a place where a wireless Access Point (AP) is installed. The wireless LAN module supports the wireless LAN provision (IEEE802.11x) of the Institute of Electrical and Electronics Engineers (IEEE). The other short range communication modules wirelessly perform short range communication between the mobile terminal 100 and the external device under a control of the controller 110. The other short-range communication schemes include an Infrared Data Association (IrDA) scheme and the like.

The storage unit 130 stores signals or data input/output related to the operation of the controller 110, the communication unit 120, the touch screen 140 and the input/output unit 150, under a control of the control unit 110. When the mobile terminal 100 includes the magnetic force detecting unit 610, as described in reference to FIG. 16a, the storage unit 130 stores various signals/data corresponding to the operation of the magnetic force detecting unit 610. When the angle of the cover is determined by using the angle information providing unit 620, as described in reference to FIG. 16b, the storage unit 130 stores various signals/data corresponding to the operation of the angle information providing unit 620. The storage unit 130 stores programs and applications for controlling the mobile terminal 100 or the controller 110, and programs and data for executing various functions. The term "storage unit" refers to the ROM 112, the RAM 113, or a memory card (not shown), e.g. an SD card and a memory stick, inserted in the mobile terminal 100. The storage unit 130 also include a non-volatile memory, a volatile memory, a Hard Disk Drive (HDD), or a Solid State Drive (SSD). The storage unit 130 is a machine-readable medium, e.g., a computer-readable medium, and the phrase "machine-readable medium" is defined as a medium for providing data to the machine so that the machine performs a specific function. The machine-readable medium is a storage medium. The storage unit 130 includes a non-volatile medium and a volatile medium. All of these media should be of a type that allows commands transferred by the media to be detected by a physical mechanism through which the machine reads the commands. The machine-readable medium includes, though is not limited to, at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a Flash-EPROM.

According to the embodiment of the present invention, the storage unit 130 stores information corresponding to the type of the cover. Accordingly, when the front cover unit 210 covers the mobile terminal 100, information on a size of a display screen displayed on the touch screen 140 is stored in the storage unit 130, according to the type of cover 200. The controller 110, then controls to display a screen adapted to the type of the cover 200, based on the size information stored in the storage unit 130.

The touch screen 140 provides various Graphical User Interfaces (GUIs) to a user. For example, the touch screen 140 receives various gesture inputs including proximity, a touch and the like, through a user's body, e.g., fingers, or a touchable input unit 158, e.g., a pen. The touch screen 140 is implemented as, for example, a resistive type touch screen, a capacitive type touch screen, an infrared type touch screen, or a ultra-sonic wave type touch screen. As described above, according to the embodiment of the present invention, the touch screen 140 displays a screen for execution of an application, a screen for a messenger, a screen for generation of a message, a screen for receipt of a message, and the like, under the control of the controller 110.

The input/output unit 150 includes a button 152, a microphone 154, a speaker 156, and an input unit 158. The input/output unit 150 is not limited to those described above, and may include a cursor controller such as a mouse, a trackball, a joystick and cursor directional keys, in order to control movement of a cursor on the touch screen 140 and communication with the controller 110. One or more buttons 152 may be provided for the mobile terminal 100, and provide various input signals to the controller 110, according to a pushing operation of the user. The microphone 154 is capable of receiving an input of a voice or sound involved in various sound sources to generate electric signals under the control of the controller 110. The speaker 156 outputs sounds corresponding to various signals, e.g., a radio signal, a broadcasting signal, a digital audio file, a digital video file, and the like, according to execution of an application, under the control of the controller 110. The input unit 158 may be inserted and stored in the mobile terminal, or may be a separately configured device or object. In the case when the input unit 158 is inserted to and stored in the mobile terminal 100, the input unit 158 is withdrawn or detached from the mobile terminal 100. The input unit 158 may be an input means such as a stylus pen (hereinafter, referred to as a pen), or a user's finger, which is capable of performing an input such as proximity or a touch into the touch screen 140.

FIG. 17 illustrates a layout of a first and a second page displayed on a mobile terminal, based on an opening angle of a cover, according to a first embodiment of the present invention.

Referring to (a) of FIG. 17, a status of the mobile terminal 100 which is covered with the front cover unit 210 is shown. The controller 110 determines that the mobile terminal 100 is covered with the front cover unit 210 when an angle between the mobile terminal 100 and the front cover unit 210 is between zero and a predetermined number of degrees. For example, controller 100 determines that the mobile terminal 100 is covered with the front cover unit 210 when an angle between the mobile terminal 100 and the front cover unit 210 is less than thirty degrees, as well as when the angle is zero degrees. However, the position of thirty degrees is merely exemplary, and the embodiment of the present invention is not limited thereto. For example, the controller 110 may determine that the mobile terminal 100 is covered with the front cover unit 210 when the angle between the mobile terminal 100 and the front cover unit 210 is less than twenty-five degrees or twenty degrees. If it is determined that the mobile terminal 100 is covered with the front cover unit 210, the controller 110 controls to display a first page 1710. In the case that the front cover unit 210 is a type of a cover in which a window area is present, a standby screen having a size adapted to the window area is displayed as a preferred embodiment of the first page 1710. A current time, date, a day of the week, and the like may be displayed on the standby screen. Further, brief information related to a notification event such as a notification of receiving an SMS and a notification of receiving a missed call, may be displayed. Further, if the front cover unit 210 is a type of a cover in which a window area is not present, the first page 1710 is a black screen 1760, as shown in (b) of FIG. 25, on which no contents are displayed at all.

The embodiments with respect to the first page 1710 described above are merely exemplary, and a home execution screen, a previously displayed execution screen, a lock releasing screen, a screen for displaying detailed information on a notification event of the mobile terminal, and the like may be displayed on the first page 1710, according to the embodiment. Briefly, the first page 1710 is a screen before a conversion to a second page 1720, and the second page 1720 is a screen newly displayed when or after the front cover unit 210 is opened. Preferably, the first page 1710 is the above-mentioned standby screen, and the second page is, for example, the home execution screen, the execution screen just before the front cover unit 210 covers the mobile terminal 100, the lock releasing screen, or the screen for displaying detailed information on the notification event for the mobile terminal 100. The description of the first page 1710 and the second page 1720 is merely exemplary, and the first page 1710 and the second page 1720 may be variously modified and embodied according to a process of manufacturing the mobile terminal 100 or a user's setting.

The controller 110 determines which area of the touch screen 140 the front cover unit 210 exposes when it is opened, based on the information on the type of the cover 200 provided by the cover type information providing unit 250. Thus, the controller 110 controls to display the second page 1720 in the area of the touch screen 140 which is exposed when the front cover unit 210 is opened, as shown in (b), (c) and (d) of FIG. 17.

(b) of FIG. 17 shows the front cover unit 210 opened at an angle greater than a first angle 1770. Herein, the first angle 1770 refers to an initial angle of the front cover unit 210 when the controller 110 determines that the front cover unit 210 is opened. That is, the first angle 1770 means an angle of the front cover unit 210 when the second page 1720 is displayed along with the first page 1710. With reference to an embodiment in which it is determined that the front cover unit 210 covers the mobile terminal 100 and the angle between the mobile terminal 100 and the front cover unit 210 is less than thirty degrees, the first angle 1770 is thirty degrees. As shown in (b) of FIG. 17, the controller 110 controls to display the first page 1710 and the second page 1720 while the two pages overlap each other at an area of the touch screen 140 that is a predetermined ratio. The term "page" means one screen including various UIs displayed on the touch screen 140. The controller 110 controls to display an overlapping area 1730 in the form of a ghost view, as shown in (c) of FIG. 17. That is, in order to meet a emotional satisfaction of a user, the controller 110 controls to display the overlapping area 1730 unclearly, e.g. with a blurred effect. Further, the controller 110 controls to display various visual effects such as a gradation in the overlapping area 1730. That is, the controller 110 controls to gradually change the degree of clarity from one end of the overlapping area 1730 to the other end. Thus, the overlapping area 1730 appears more blurred on one end and gradually becomes more clear upon approaching the other end of the overlapping area 1730.

(c) of FIG. 17 shows the front cover unit 210 opened at an angle which is greater than the first angle 1770 and less than a second angle 1780. As the opening angle of the front cover unit 210 increases, the ratio of the displayed area of the second page 1720 to the area of the entire touch screen 140 is increased. In (c) of FIG. 17, the ratio of the displayed area of the first page 1710 is 0.85 of the area of touch screen 140, the displayed ratio of the second page 1720 is 0.55 of the area of the touch screen 140, and the ratio of the overlapping area 1730 is 0.4 of the area of the touch screen 140. However, these ratios are merely exemplary. As shown in (c) of FIG. 17, the controller 110 controls to display a part of the first page 1710 and a part of the second page 1720 corresponding to the overlapping area 1730 in the form of a ghost view. That is, the overlapping area 1730 is blurred or not as clearly displayed in comparison with the remaining areas of the first and second pages 1710 and 1720. The ratio of the area of each page that is displayed to the area of the entire touch screen 140 is obtained from the mapping table and is predetermined according to the angle between the mobile terminal 100 and the front cover unit 210. The mapping table is stored in the storage unit 130.

(d) of FIG. 17 shows the front cover unit 210 opened at the second angle 1780. The second angle refers to a minimal angle of the front cover unit 210 when the controller 110 determines that the front cover unit 210 is completely opened. For example, the second angle is ninety degrees. Similarly to the first angle, the second angle also may be variously changed, and, for example, may be set to be an angle of one hundred twenty degrees. If it is determined that the front cover unit 210 is opened at an angle equal to or greater than the second angle, the controller 110 controls to display only the second page 1720 on the touch screen 140.

According to the embodiment shown in FIG. 17, the first and second pages provide a desired visual effect while continuously moving when the user opens the front cover unit 210 of the mobile terminal 100. It is, therefore, possible to meet the emotional satisfaction of the user through the page layout.

FIG. 18 illustrates a layout of a first and a second page displayed on a mobile terminal, based on an opening angle of a cover, according to a second embodiment of the present invention.

Referring to FIG. 18, the first and second pages 1710 and 1720 have no overlapping area 1730, contrary from the embodiment shown in FIG. 17. In all other respects, the description provided for the embodiment shown in FIG. 17 is identically applied here. As shown in (b) of FIG. 18, the first and second pages 1710 and 1720 are displayed in a desired proportion, but without an overlapping area. However, in order to meet the emotional satisfaction of the user, the controller 110 may control to display a desired visual effect in an area near a boundary area of the first page 1710 and/or the second page 1720. For example, the controller 110 may control to display an area near the boundary area of the first page 1710 and/or the second page 1720 less clearly than other areas of the two pages.

FIG. 19 provides a comparative view of a first and a second page displayed in a mobile terminal, according to the first and second embodiments of the present invention.

Referring to FIG. 19, the layout of the first and second pages 1710 and 1720, respectively, according to the first embodiment described in reference to FIG. 17, is shown in (a) of FIG. 19. The layout of the first and second pages 1710 and 1720, respectively, according to the second embodiment described in reference to FIG. 18, is shown in (a) of FIG. 19.

In (a) of FIG. 19, the first and second pages 1710 and 1720, respectively, are displayed in such a manner that the overlapping area 1730 of the first page 1710 and the second page 1720 is displayed unclearly and each of the first page 1710 and the second page 1720 gradually becomes clearer toward both sides of the touch screen 140.

In (b) of FIG. 19, the first and second pages 1710 and 1720, respectively, are displayed in such a manner that there is no overlapping of the first page 1710 with the second page 1720. However, in order to meet the emotional satisfaction of the user as described above, the controller 110 may control to display a desired visual effect in an area near a boundary area of the first page 1710 and/or the second page 1720.

FIGS. 20 to 22 illustrate examples of a first and a second page displayed on a mobile terminal, based on an opening angle of a cover, according to the first embodiment of the present invention.

Referring to FIG. 20, a standby screen is displayed as the first page 1710. When the front cover unit 210 is open at a degree greater than or equal to a first angle 1770 and less than a second angle 1780, the home execution screen, which is the second screen 1720, is displayed along with the standby screen and with an overlapping area 1730, according to the first embodiment of the present invention. As the degree at which the front cover unit 210 is open increases, the ratio of the area of the home execution screen displayed to the area of the touch screen 140 increases. When the front cover unit 210 is opened at a degree greater than or equal to the second angle 1780, only the home execution screen is displayed.

Referring to FIG. 21, if the standby screen, i.e., the first page 1710, is converted when the front cover unit 210 covers the mobile terminal 100, an execution screen previously displayed prior to the mobile terminal 100 being covered by the front cover unit 210 is displayed as the second page 1720. Information on the second page 1720 is stored in the storage unit 130. When the front cover unit 210 is open at a degree greater than or equal to a first angle 1780 and less than a second angle 1790, the previously displayed execution screen is displayed as the second page 1720, along with a standby screen and an overlapping area 1730, according to the first embodiment of the present invention. As the degree at which the front cover unit 210 is open increases, the ratio of the area of the previously displayed execution screen which is displayed to the area of the touch screen 140 increases. When the front cover unit 210 is opened at a degree greater than or equal to the second angle 1790, only the previously displayed execution screen is displayed.

Referring to FIG. 22, a lock releasing screen is displayed as the second page 1720. The lock releasing screen is set by the user in order to require a user authorization when the user enters the home execution screen. In this case, when the front cover unit 201 is open at a degree greater than or equal to a first angle 1780 and less than a second angle 1780, the lock releasing screen is displayed as the second page 1720, along with a standby screen, which is the first page 1710, and an overlapping area 1730, according to the first embodiment of the present invention. As the degree at which the front cover unit 210 is open increases, the ratio of the area of the lock releasing screen displayed to the area of the touch screen 140 increases. When the front cover unit 210 is opened at a degree greater than or equal to the second angle 1780, only the lock releasing screen is displayed.

In FIGS. 20, 21 and 22, it is shown that the first page and the second page are displayed according to the first embodiment of the present invention. However, the first page and the second page may be displayed according to the second embodiment of the present invention.

FIG. 23 illustrates one or more objects of a second page displayed on a mobile terminal, gradually being displayed and moved in a direction in which a cover opens as the cover opens, according to an embodiment of the present invention.

Referring to FIG. 23, the controller 110 controls to move and display one or more objects, e.g., text and/or UI, included in the second page 1720 in a direction in which the front cover unit 210 is opened.

(a) of FIG. 23 shows the front cover unit 210 covering the mobile terminal. In this case, only the first page 710 which is a standby screen is displayed.

(b) of FIG. 23 shows the front cover unit 210 opened at the first angle. In this case, the first page 1710 and the second page 1720 are displayed in desired proportion. Thus, the page layout with reference to the first embodiment of the present invention is applied to the first and second pages 1710 and 1720, respectively, in the embodiment described herein. In (b) of FIG. 23, however, the controller 110 controls not to display one or more objects, e.g., text and/or UI included in the second page 1720 if the front cover unit 210 is opened at the first angle. That is, the controller 110 controls to display only the background screen of the second page 1720.

(c) of FIG. 23, shows the front cover unit 210 open at the third angle. The third angle (for example, seventy degrees) is an angle at which the one or more objects included in the second page 1720 are displayed. The controller 110 controls to display the background of the second page 1720 and the objects included in the second page 1720 at a time interval, such that the one or more objects included in the second page 1720 are sequentially displayed in the direction in which the front cover unit 210 is opened.

(d) of FIG. 23, shows the one or more objects of the second page 1720 is displayed as if they move in the direction in which the front cover unit 210 is opened. If the UI 1711 included in the first page 1710 is displayed in the second page 1720, the controller 110 converts the first page 1710 into the second page 1720, and then controls to display the UI 1711 at a predetermined position in the second page 1720.

FIGS. 24 and 25 illustrate a black screen and a page displayed on a mobile terminal, based on an opening angle of a cover, according to an embodiment of the present invention.

Referring to FIG. 24, the controller 110 gradually displays the first and second pages 1710 and 1720, respectively, in the direction in which the front cover unit 210 is opened. The proportion of each page that is displayed is predetermined based on the opening angle of the front cover unit 210. Preferably, the first page 1710 is a black screen displayed as the standby screen. The description of the embodiment shown in FIGS. 20, 21, 22 and 23 describing the concept in which the second page 170 is displayed according to the opening angle of the front cover unit 210 is identically applied in reference to the embodiment described herein in reference to FIG. 24.

Referring to FIG. 25, in another embodiment, the controller 110 controls to display the black screen 1760 covering the first page 1710 when the angle between the front cover unit 210 and the mobile terminal 100 is less than the first angle 1770. In this case, the black screen 1760 is displayed with the first page 1710 completely covered, such that the first page 1710 is not visible.

As shown in (b) and (c) of FIG. 25, the controller 110 controls to adjust a transparency of the black screen 1760 displayed covering the first page 1710 according to the opening angle of the front cover unit 210. Accordingly, the user can visually identify the objects of the first page 1710 under the black screen 1760 when the front cover unit 210 opens at an angle greater than or equal to the first angle 1770. Further, the controller 110 controls to gradually decrease the transparency in the direction in which the front cover unit 210 is opened. However, the degree of transparency may be changed by a user's setting or a configuration process of the mobile terminal 100.

In the embodiment shown in FIGS. 24 and 25, the first page 1710 is, for example, a home execution screen, a previously displayed execution screen, or a lock releasing screen. In the embodiments shown in FIG. 25, the black screen is shown as a visual effect and not as a page.

Further, in the embodiments shown in FIGS. 24 to 25, an area corresponding to an area in which the first page 1710 is displayed is in a sleep mode, i.e., a state in which the touch screen 140 is turned off. To do this, the controller 110 controls to entirely or partially turn off the touch screen 140. If it is determined the front cover unit 210 covers the mobile terminal, the controller 110 may control to temporarily interrupt electric power applied to the touch screen 140 so that the touch screen 140 is entirely turned off. Alternatively, the controller 110 may control to interrupt a supply of electric power to an area corresponding to a portion in which the first page 1710, according to the angle between the front cover unit 210 and the mobile terminal 100. Further, the controller 110 may control to apply electricity to an area corresponding to a portion in which the second page 1720 is displayed, in order to display the second page 1720.

The description of the sleep mode is not limited to only the embodiments shown in FIGS. 24 and 25. The description of the sleep mode may also be applied to embodiments in which a cover having no window area is applied.

Further, in FIGS. 20 to 25, only the case in which the front cover unit 210 is opened is shown. However, in the case in which the front cover unit 210 covers the mobile terminal, the description for the opening of the cover related to FIGS. 20 to 25 may be applied herein in reverse sequence (i.e. in inverse order) when the cover is covered.

FIGS. 26 and 27 illustrate a display of detailed contents of a notification event on a page of a mobile terminal, based on an opening angle and direction of a cover, according to an embodiment of the present invention.

Referring to FIG. 26, when a notification event, e.g., an event notifying the user of receipt of an SMS, of a missed call, and the like, occurs in the mobile terminal 100, the controller 110 controls to display information about the notification event, based on the page layout according to the second embodiment of the present invention.

(a) of FIG. 26, shows that a SMS is received as the notification event 2610.

(b) of FIG. 26, shows the second page 1720 displayed without an overlapped area based on a desired proportion with reference to a boundary 1740. (b) of FIG. 26 further shows the front cover unit 210 opened at the first angle 1770. If the user wants to view the contents of the received SMS, the user can open the front cover unit 210 and view the contents as shown in (c) of FIG. 26. As the opening angle of the front cover unit 210 increases to a degree that is greater than the first angle and less than the second angle 1780, the controller 110 controls to display the second page 1720 in an area larger than that shown in (b) of FIG. 26 and based on a predetermined proportion.

(d) of FIG. 26, shows the front cover unit 210 opened at the second angle 1780. In this case, the controller 110 controls to display the home execution screen as the second screen 1720.

Further, (b) and (c) FIG. 26 show a desired visual effect, e.g., blurred effect, displayed in the first page 1710. The controller 110 controls to display the visual effect in such a manner that a part of the first page 1710 near the boundary 1740 is not clearly displayed.

Referring to FIG. 27, an embodiment is shown in which the description related to FIG. 26 is applied to a different type of a cover, e.g., a type of a cover 210 opened from a lower portion to an upper portion of the mobile terminal 100. In the embodiment shown in FIG. 27, only the position at which the second page 1720 is displayed is different than that in the embodiment described in reference to FIG. 26, and the description related to FIG. 26 may be identically applied.

In FIGS. 26 and 27, only a case that the front cover unit 210 is opened is shown. However, in the case that the front cover unit 210 covers the mobile terminal, the description related to FIGS. 26 and 27 is identically applied in reverse sequence (i.e. in inverse order) for the opening of the cover shown in FIGS. 26 and 27.

FIG. 28 illustrate a display of detailed contents of a notification event 2610 on a second page of a mobile terminal, based on a touch event of a user, according to an embodiment of the present invention.

Referring to FIG. 28, the user performs a touch input 2810 on the touch screen 140 in the state that the first and second pages 1710 and 1720 are displayed as shown in (c) of FIG. 28. The controller 110 controls to display the second page 1720 including detailed contents of a notification event 2610, when the touch input 2810 of the user is received. That is, in the case that the front cover unit 210 is opened at the second angle 1780, the controller 110 controls to display not the home execution screen but a page including the contents of the notification event 2610 as the second page 1720 when the touch input 2810 is received. In (c) of FIG. 28, it is shown that the touch input is performed. However, the touch input 2810 may also be performed in the state shown in (c) of FIG. 28. That is, the touch input 2810 may be performed when the front cover unit 210 is open at an angle which is equal to or greater than the first angle 1770 and less than the second angle 1780. In this case, the controller 110 controls to display the SMS, as shown in (d) of FIG. 28. However, the reverse case is possible. That is, when the touch input 2810 is received, for example, the home execution screen may be displayed as the second page 1720, and when there is no touch input 2810, a page including the detailed contents of the notification event 2820 may be displayed as the second page 1720.

(b) and (c) of FIG. 28 show a desired visual effect, e.g., a blurred effect, displayed in the first page 1710. The touch input 2810 may include a tap, a double tap, a touch and hold, and the like.

FIGS. 29 to 30 illustrate a display of detailed contents of various types of notification events on a page of a mobile terminal, based on an opening angle of a cover, according to an embodiment of the present invention.

Referring to FIG. 29, it is shown in (a) of FIG. 29, on the first page 1710 that four SMS events and two missed call events occur in the mobile terminal 100. However, the detailed contents of the four SMS events may not be displayed due to a spatial limitation. In the embodiment shown in FIG. 29, it is shown that a second page 1720 including contents of each SMS event is displayed by using the page layout according to the second embodiment of the present invention, when the front cover unit 210 is opened at an angle which is equal to or more than the first angle 1770. As shown in (b) and (c) of FIG. 29, the proportion of the area of the second page 1720 displayed is based on the opening angle of the front cover unit 210.

Further, in the embodiment shown in FIG. 29, the controller 110 controls to display a second page 1720 including contents of the notification events 2610 as shown in (d) of FIG. 29, when the touch input 2810 is received in the state where the front cover unit 210 is opened at an angle which is greater than or equal to the first angle 1770 and less than the second angle 1780. If there is no touch input 2810, the controller 110 controls to display, for example, the home execution screen in the second page 1720 when the front cover unit 210 is opened at an angle which is equal to or greater than the second angle.

Referring to FIG. 30, it is shown that the content of a plurality of notification events 2610 is not wholly displayed in the first page 1710. As shown in (b) of FIG. 30, when the front cover unit 210 is opened at the first angle 1770, the controller 110 controls to display the second page 1720 including the contents related to the plurality of notification events 2610. However, in order to smoothly search for the contents of the plurality of notification events 2610, a means such as a scroll bar (not shown) may be displayed as well. As shown in (c) of FIG. 30, the proportion of the area of the second page 1720 is displayed is based on the opening angle of the front cover unit 210. If the touch input 2810 is received, the controller 110 controls to display a screen including the contents related to the plurality of notification events 2610 in the second page 1720, when the front cover unit 210 is opened at an angle which is greater than or equal to the second angle 1780, as shown in (d) of FIG. 30. If there is no touch input 2810, the controller 110 controls to display, for example, the home execution screen in the second page 1720 when the front cover unit 210 is opened at an angle which is equal to or greater than the second angle 1780.

In FIGS. 29 and 30, a desired visual effect is displayed in the first page 1710.

Alternatively, in the embodiment shown in FIGS. 29 and 30, when the notification event screen is initially displayed as the second page 1720 and the touch input 2810 is received, the home execution screen may be displayed as the second page 1720. In this alternate embodiment, when there is no touch input 2810, a page including the detailed contents of the notification event 2810 may be displayed as the second page 1720. The description of the embodiment described with reference to FIGS. 29 and 30 may be applied to in the case where the front cover unit 210 covers the mobile terminal 100. However, in this case, since the user identifies the contents of the notification event 2610, further, not the notification event screen but a predetermined page is displayed as the first page 1710 when the front cover unit 210 covers the mobile terminal 100.

FIG. 31 is a flowchart illustrating a process of controlling a mobile terminal to display a first and a second page on a mobile terminal, based on an opening angle of a cover, according to the embodiment of the present invention.

Referring to FIG. 31, in a process of controlling the mobile terminal 100 according to an embodiment of the present invention, the first page 1710 is displayed on the touch screen 140 in step S3100.

In the state that the first page 1710 is displayed, in step S3110, the opening angle of the front cover unit 210 is determined.

It is then determined, in step S3120, whether the front cover unit 210 is opened at an angle which is greater than or equal to a first angle 1770. If the front cover unit 210 is not opened at an angle which is greater than or equal to the first angle 1770, the process returns to step S3110 to again determine the opening angle of the front cover unit 210.

On the other hand, if the front cover unit 210 is opened at an angle which is greater than or equal to the first angle 1770, then in step S3130, an area of the second page 1720 is displayed along with an area of the first page 1710.

It is then determined in step S3140, whether the front cover unit 210 is opened at an angle which is greater than or equal to a second angle 1780. If the front cover unit 210 is not opened at an angle which is greater than or equal to the second angle 1780, then the process returns to step S3130 to continue to display the area of the second page 1720 together with the area of the first page 1710.

On the other hand, if the front cover unit 210 is opened at an angle which is greater than or equal to the second angle 1780, then the entire second page 1710 is displayed in step S3150. With respect to the process of controlling the mobile terminal according to the embodiment of the present invention, the description of the mobile terminal is identically applied and thus the detailed description of the process will be omitted.

FIGS. 32 and 33 illustrate the display and rearrangement of objects displayed on a page of the mobile terminal, based on an opening angle of a cover, according to an embodiment of the present invention.

Referring to FIG. 32, various UIs 1712 (1712a, 1712b and 1712c) and 1713 are displayed in the first page 1710. When the front cover unit 210 is opened at the first angle, the controller 110 controls to rearrange and display positions of the UIs 1712a, 1712b, 1712c and 1713. The UIs 1712a, 1712b, 1712c and 1713 may be, for example, short-cut icons for an execution of an application. The positions of the UIs 1712a, 1712b, 1712c and 1713 are rearranged in a direction to which the front cover unit 210 is opened, as shown in (b) of FIG. 32. The controller 110 determines the direction to which the front cover unit 210 is opened, based on the information on the type of the cover 200 provided by the cover type information providing unit 250.

As shown in (b) of FIG. 32, if a plurality of UIs is present, the controller 110 controls to display all of the UIs.

As shown in (c) of FIG. 32, the controller 110 controls to move and display the UIs depending on the direction to which the front cover unit 210 moves and the angle of the front cover unit 210.

As shown in (d) of FIG. 32, if the front cover unit 210 is opened at an angle which is greater than or equal to the second angle 1780, the controller 110 controls the mobile terminal 100 so that the positions of the UIs are not changed.

Referring to FIG. 33, it is shown that the embodiment shown in FIG. 32 is applied to a case in which a cover 200 which has no window area is used for the mobile terminal 100. As shown in FIG. 33, when the user opens the front cover unit 210 at an angle which is greater than or equal to the first angle 1770, the UIs 1714, 1715, 1716, and 1717 are rearranged and displayed. Referring to (b), (c) and (d) of FIG. 33, for example, a background screen included in the first page 1710 is initially displayed on the touch screen 140, and the UIs 1714, 1715, 1716, and 1717 are rearranged and displayed based on the opening angle of the front cover unit 210. The description of the embodiments shown in FIG. 24 and/or FIG. 25 will be identically applied to the embodiment shown in FIG. 33. That is, the second page 1720 or the first page 1710 is displayed according to the opening angle of the front cover unit 210, while the UIs, e.g. the short-cut icons for execution of the applications, included in the second page 1720 or the first page 1710 are rearranged and displayed. In FIG. 33, it is shown that the first page 1710 is displayed at the opening angle of the front cover unit 210. In FIG. 33, a background screen which is included in the first page 1710 and of which the transparency is adjusted at the first angle is initially displayed on the touch screen 140, and only the UIs 1714, 1715, 1716, and 1717 are rearranged and displayed according to the opening angle of the front cover unit 210.

In FIGS. 32 and 33, a case that the front cover unit 210 is opened is shown. However, in the case where the front cover unit 210 covers the mobile terminal, the description is identically applied in reverse sequence (i.e. in inverse order), when the cover is covered, for the opening of the cover shown in FIGS. 32 and 33.

FIG. 34 is a flowchart illustrating a process of controlling a mobile terminal to display and rearrange the positions of objects on a page on a mobile terminal, based on an opening angle of a cover, according to various embodiments of the present invention.

Referring to FIG. 34, in the process of controlling the mobile terminal 100 according to the embodiment of the present invention, at least one object is displayed in step S3400.

In step S3410, the opening angle of the front cover unit 210 is determined while the at least one object is displayed.

In step S3420, it is determined whether the opening angle of the front cover unit 210 is greater than or equal to the first angle 1770. If the opening angle of the front cover unit 210 is not greater than or equal to the first angle 1770, then the process returns to step S3410 to again determine the opening angle of the front cover unit. If the opening angle of the front cover unit 210 is greater than or equal to the first angle 1770, then in step S3430, the positions at which the one or more objects is displayed is rearranged and displayed according to the opening angle of the front cover unit 210.

In step S3440, it is then determined whether the opening angle of the front cover unit 210 is greater than or equal to the second angle 1780. If the opening angle of the front cover unit 210 is less than the second angle 1780, then the process returns to step S3430 and continues to rearrange and display the one or more objects according to the opening angle of the front cover unit 210. If the opening angle of the front cover unit 210 is greater than or equal to the second angle 1780, then in step S3450 the at least one object is displayed at positions corresponding to the second angle 1780 regardless of a change of the opening angle.

FIGS. 35 and 36 illustrate a cover in which a first page is converted to a second page on a mobile terminal, based on an opening angle of a cover as compared to a first angle, according to various embodiments of the present invention.

Referring to FIGS. 35 and 36, it is shown that the controller 110 controls a page displayed on the touch screen 140 in a different manner from the above-mentioned embodiments, based on only the first angle 1770.

In (a) of FIG. 35, the controller 110 controls to display the first page 1710. In (b) of FIG. 35, the controller 110 controls to display the first and second pages 1710 and 1720 having an overlapping area on the touch screen 140, according to the embodiment shown in (a) of FIG. 19, if the front cover unit 210 is opened at the first angle 1770. As described above, the above-mentioned visual effect is applied to the overlapping area 1730 in order to meet a emotional satisfaction of the user.

In (b), (c) and (d) of FIG. 35, the controller 110 controls to display the second page 1720, regardless of whether an angle between the front cover unit 210 and the mobile terminal 100 is greater than or equal to the second angle 1780 in the state shown in (b) of FIG. 35. That is, if the angle between the front cover unit 210 and the mobile terminal 200 is greater than or equal to the first angle 1770, the controller 110 controls to display the second page 1720 through steps shown in (b), (c) and (d) FIG. 35. Further, if the angle between the front cover unit 210 and the mobile terminal 200 is less than a first angle 1770, the controller 110 determines that the cover 200 is not open and displays the first page 1710. In (b) and (c) of FIG. 35, it is shown that a screen is displayed which includes the overlapping area 1730 with the desired visual effect according to the embodiment shown in (a) of FIG. 19. However, the first and second pages 1710 and 1720 are displayed according to the embodiment shown in (b) of FIG. 19.

In FIG. 36, a cover 200 having no window area according to another embodiment of the present invention, is shown. In the cover 200 having no window area, the screen is controlled according to an opening angle of the front cover unit 210, in a manner identical to that of the embodiment described in reference to FIG. 35, and thus the description of the embodiment in FIG. 35 will be applied herein. In the screen displayed on the touch screen 140, the embodiment shown in FIG. 24 and/or FIG. 25 will be applied.

In FIGS. 35 and 36, only a case in which the front cover unit 210 is opened is shown. However, in the case in which the front cover unit 210 covers the mobile terminal, the description for the opening of the cover described in reference to FIGS. 35 and o 36 is identically applied in reverse sequence (i.e. in inverse order) when the cover is closed.

FIG. 37 illustrate a display of a first, second, and third page on a mobile terminal, based on a bent angle of a cover, according to an embodiment of the present invention.

Referring to FIG. 37, the cover 200, according to another embodiment of the present invention, includes the front cover unit 210 bent by external force more than a desired level. A cover 200 according to still another embodiment of the present invention further include a flexible sensor 624 disposed on a front cover unit 210 in order to obtain data for a bent angle of the front cover unit 210. The cover 200 in the embodiment of FIGS. 37 and 38 includes a magnetic force providing unit 600 and a flexible sensor 624 disposed on the front cover unit 210, or a flexible sensor 622 in which an angle information providing unit 620 is included in a cover connecting portion 230 and a flexible sensor 624 disposed on the front cover unit 210. The front cover unit 210 is manufactured of a resilient material to allow the front cover unit 210 to be bent within a desired angle. Further, the front cover unit 210 may include a flexible Printed Circuit Board (PCB) electrically connected to the flexible sensor 624 in order to transmit data on angle if necessary.

Similar to the embodiment described in reference to FIGS. 35 36, in the embodiment described in reference to FIG. 37, the controller 110 determines whether the opening angle of the front cover unit 210 is the first angle 1770. When the second page 1720 is entirely displayed on the touch screen 140 after the front cover unit 210 is opened at the first angle 1770, the flexible sensor 624 detects the cover being bent at an angle greater than or equal to a desired level due to an external force and obtains data on the bent angle. The controller 110 determines whether the front cover unit 210 is bent at an angle greater than or equal to the predetermined angle. When the front cover unit 210 is bent at the angle greater than or equal to the predetermined angle, the controller 110 controls to convert and display the screen into the third page 1750 different from the first and second pages 1710 and 1720. If, for example, the home execution screen consists of multiple pages, the third page 1750 is a home execution screen different from the home execution screen displayed as the second page 1720.

FIG. 38 illustrates scrolling of a page on a mobile terminal, based on a bent angle of a cover, according to an embodiment of the present invention.

Referring to FIG. 38, a screen scrolling function is shown. According to an embodiment of the present event, the mobile terminal 100 performs a screen scrolling function when the front cover unit 210 is bent at an angle greater than or equal to the predetermined angle. The controller 110 determines that the front cover unit 210 is bent at the angle greater than or equal to the predetermined angle, based on the data for the angle obtained by the flexible sensor 624 disposed on the front cover unit 210. If the front cover unit 210 is bent at the angle greater than or equal to the predetermined angle, the controller 110 displays a page which cannot be fully displayed due to size limitations of the touch screen 140. For example, when the user applies an external force to the front cover unit 210 in a left direction as shown in (b) of FIG. 38, the controller 110 controls to perform a right scroll operation. When the user applies an external force to the front cover unit 210 in a right direction, the controller 110 controls to perform a left scroll operation. Although an example of the cover having the window area is shown in FIGS. 37 and 38, the embodiment described herein may be applied to a cover 200 having no window area at all.

Although the embodiments applied to the case where the front cover unit 210 is opened in a direction from the right to the left are generally described with respect to the descriptions of the page layouts according to the first and second embodiments of the present invention, the page layouts according to the first and second embodiments of the present invention are not limited thereto. That is, the embodiment of the present invention may be also applied to a case where the front cover unit 210 is opened in a direction from the left to the right, from an upper portion to a lower portion, or from the lower portion to the upper portion.

It will be appreciated that the embodiments of the present invention may be implemented in a form of hardware, software, or a combination of hardware and software. Any such software is stored, for example, in a volatile or non-volatile storage device such as a ROM, a memory such as a RAM, a memory chip, a memory device, or an IC, or an optical or magnetic recordable and machine (e.g., computer) readable medium such as a CD, a DVD, a magnetic disk, or a magnetic tape, regardless of its ability to be erased or its ability to be re-recorded. Further, the embodiment of the present invention can be implemented by a computer or a mobile terminal including a controller and a memory, and it can be understood that the memory corresponds to an example of the machine readable storage medium which is suitable for storing a program or programs including instructions by which the embodiments of the present invention are implemented. Accordingly, the present invention includes a program including a code for implementing the apparatus or the method defined in the appended claims of the present specification and a machine (computer, etc.) readable storage medium for storing the program. Further, the program may be electronically transferred by a predetermined medium such as a communication signal transferred through a wired or wireless connection, and the present invention appropriately includes equivalents of the program.

While the embodiment of the present invention has been described with reference to the accompanying drawings, it will be understood by those skilled in the art that the present invention may be varied and modified without departing from the technical spirit and the essential features of the present invention. Accordingly, it should be understood that the embodiments described above are merely exemplary and are not limited thereto.

The invention claimed is:

1. A mobile terminal, comprising:
a touch screen; and
a controller configured to:
identify an opening angle of a front cover unit of the mobile terminal, wherein the opening angle is an angle between the mobile terminal and the front cover unit included in a cover connected to the mobile terminal,
in response to the opening angle being a first predetermined angle, display a first page in a first area of the touch screen and a second page in a second area of the touch screen, and
in response to the opening angle being a second predetermined angle, display the first page in a third area of the touch screen larger than the first area.

2. The mobile terminal of claim 1, wherein the controller is configured to, in response to the opening angle being the first predetermined angle, simultaneously display an area of the first page and an area of the second page in respective predetermined sizes based on the opening angle.

3. The mobile terminal of claim 2, wherein the controller is configured to display a portion of the area of the first page and a portion of the area of the second page overlapping with each other in another predetermined size.

4. The mobile terminal of claim 3, wherein an overlapped area between the portion of the area of the first page and the portion of the area of the second page is displayed with a blurred effect.

5. The mobile terminal of claim 2, wherein the second page is any one of a home execution screen, a previously displayed execution screen, a lock releasing screen, or a notification event screen.

6. The mobile terminal of claim 5, wherein the controller is configured to display only the second page in response to the opening angle being the second predetermined angle.

7. The mobile terminal of claim 5, wherein the controller is configured to:
in response to the opening angle being the first predetermined angle, determine whether a touch input is received, and
in response to the touch input being received and the opening angle being the second predetermined angle, display only the notification event screen.

8. The mobile terminal of claim 2, wherein the controller is configured to:
convert the first page displayed on the touch screen into the second page in response to the opening angle being the first predetermined angle so as to display the second page, and
wherein the converting of the first page into the second page includes sequentially displaying in a direction, the area of the first page and the area of the second page, in the respective predetermined proportions based on the opening angle.

9. The mobile terminal of claim 1, further comprising a magnetic force detecting unit configured to determine the opening angle, wherein the magnetic force detecting unit includes a magnetic force detecting sensor.

10. The mobile terminal of claim 1, wherein the controller is configured to:
receive information on an angle detected by a flexible sensor disposed on a cover connecting portion included in the cover, and determine the opening angle based on the received information on the angle.

11. The mobile terminal of claim 1, wherein the controller is configured to:
display at least one object included in the second page in response to the opening angle being a third predetermined angle, and
gradually display the at least one object in a direction in which the front cover unit is opened.

12. A method of controlling a mobile terminal, the method comprising:
identifying an opening angle of a front cover unit of the mobile terminal, wherein the opening angle is an angle between the mobile terminal and the front cover unit;
in response to the opening angle being the first predetermined angle, displaying a first page in a first area of the touch screen and a second page in a second area of the touch screen; and
in response to the opening angle being a second predetermined angle, displaying the first page in a third area of the touch screen larger than the first area.

13. The method of claim 12, further comprising, in response to the opening angle being the first predetermined angle, simultaneously displaying an area of the first page and an area of the second page in respective predetermined sizes based on the opening angle.

14. The method of claim 13, wherein simultaneously displaying the area of the first page and the area of the second page in the respective predetermined proportions comprises displaying a portion of the area of the first page and a portion of the area of the second page overlapping each other in another predetermined proportion.

15. The method of claim 14, wherein an overlapped area between the portion of the area of the first page and the portion of the area of the second page is displayed with a blurred effect.

16. The method of claim 13, wherein the second page is any one of a home execution screen, a previously displayed execution screen, a lock releasing screen, or a notification event screen.

17. The method of claim 16, further comprising:
determining whether the opening angle is the second predetermined angle; and
displaying only the second page in response to the opening angle being the second predetermined angle.

18. The method of claim 16, further comprising:
in response to the opening angle being the first predetermined angle, determining whether a touch input is received; and
in response to the touch input being received and the opening angle being the second predetermined angle, displaying only the notification event screen.

19. The method of claim 16, further comprising:
displaying at least one object included in the second page in response to the opening angle being a third predetermined angle, and
gradually displaying the at least one object in a direction in which the front cover unit is opened.

20. The method of claim 13, further comprising:
converting the displayed first page into the second page in response to the opening angle being the first predetermined angle so as to display the second page,
wherein converting the first page into the second page includes sequentially displaying in a direction, the area of the first page and the area of the second page in the respective predetermined proportions based on the opening angle.

21. A mobile terminal comprising:
a touch screen; and
a controller configured to:
identify a bending angle of a cover, wherein the bending angle is an angle of a front cover unit included in the cover connected to the mobile terminal,
in response to the bending angle being a first predetermined angle, display a first page in a first area and a second page in a second area, and
in response to the bending angle being a second predetermined angle, display the first page in a third area larger than the first area.

22. A mobile terminal comprising:
a touch screen; and
a controller configured to:
identify a bending angle of a cover, and
display a first page by scrolling based on the bending angle and a direction of a front cover unit included in the cover connected to the mobile terminal, in response to the bending angle being a predetermined angle.

* * * * *